(12) United States Patent
Eaton et al.

(10) Patent No.: US 12,510,755 B2
(45) Date of Patent: Dec. 30, 2025

(54) ADJUSTABLE CAMERA SYSTEM

(71) Applicant: QUALCOMM Incorporated, San Diego, CA (US)

(72) Inventors: John Eaton, San Diego, CA (US); Manikandan Meiyoor Velayutham, Hyderabad (IN); Mario Sanchez, San Diego, CA (US); Thirukumaran Dechinamoorthy, Hyderabad (IN); Chiranjib Choudhuri, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 831 days.

(21) Appl. No.: 17/678,944

(22) Filed: Feb. 23, 2022

(65) Prior Publication Data
US 2023/0266589 A1 Aug. 24, 2023

(51) Int. Cl.
*G02B 27/01* (2006.01)
*G06V 40/16* (2022.01)
*G06V 40/20* (2022.01)
*G10L 15/25* (2013.01)
*G03B 30/00* (2021.01)

(52) U.S. Cl.
CPC ....... *G02B 27/0172* (2013.01); *G06V 40/171* (2022.01); *G06V 40/20* (2022.01); *G10L 15/25* (2013.01); *G02B 2027/0138* (2013.01); *G03B 30/00* (2021.01)

(58) Field of Classification Search
CPC ............ G02B 27/0172; G02B 27/0176; G02B 2027/0138; G02B 2027/0154; G02B 2027/0178; G02B 27/0093; G06F 3/1431; G06F 3/147; G09G 3/001; G06V 40/171; G06V 40/20; G10L 15/25; G03B 30/00
See application file for complete search history.

(56) References Cited

U.S. PATENT DOCUMENTS

| | | | |
|---|---|---|---|
| 2012/0113209 A1 | 5/2012 | Ritchey et al. | |
| 2017/0091535 A1 | 3/2017 | Yu et al. | |
| 2018/0143434 A1 | 5/2018 | Hamra | |
| 2024/0012470 A1* | 1/2024 | Martin | G02B 27/0093 |

FOREIGN PATENT DOCUMENTS

| | | |
|---|---|---|
| CN | 210982920 U | 7/2020 |
| WO | 2016068092 A1 | 5/2016 |

OTHER PUBLICATIONS

International Search Report and Written Opinion—PCT/US2023/013353—ISA/EPO—Jun. 21, 2023.

* cited by examiner

*Primary Examiner* — Nelson M Rosario
(74) *Attorney, Agent, or Firm* — QUALCOMM Incorporated

(57) ABSTRACT

Systems and techniques are provided for an adjustable camera system for mouth tracking. An example apparatus can include a housing with an opening formed in a first side of the housing, wherein one or more surfaces of the housing are configured to engage a head of a user; and a structure including a lens configured to receive incident light, wherein the structure is configured to move from a retracted state where at least a portion of the structure is retracted into the opening in the first side of the housing, to an extended state where at least a portion of the structure that includes the lens structure extends from the first side of the housing.

33 Claims, 11 Drawing Sheets

↙ 900

ACTIVATE AN ADJUSTMENT MECHANISM THAT MOVES A CAMERA STRUCTURE OF A MOBILE DEVICE FROM A RETRACTED STATE WHERE AT LEAST A PORTION OF THE CAMERA STRUCTURE IS RETRACTED INTO AN OPENING OF A HOUSING OF THE MOBILE DEVICE, TO AN EXTENDED STATE WHERE THE CAMERA STRUCTURE EXTENDS FROM A FIRST SIDE OF THE HOUSING OF THE MOBILE DEVICE
902

↓

CAPTURE ONE OR MORE IMAGES USING A CAMERA SENSOR OF THE CAMERA STRUCTURE WHILE THE CAMERA STRUCTURE IS IN THE EXTENDED STATE
904

↓

DETECT A MOUTH DEPICTED IN THE ONE OR MORE IMAGES
906

FIG. 9A

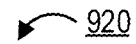

```
MOVE A STRUCTURE OF A MOBILE DEVICE FROM A
RETRACTED STATE WHERE AT LEAST A PORTION OF THE
STRUCTURE IS RETRACTED INTO AN OPENING IN A FIRST
SIDE OF A HOUSING OF THE MOBILE DEVICE, TO AN
EXTENDED STATE WHERE AT LEAST A PORTION OF THE
STRUCTURE THAT INCLUDES A LENS CONFIGURED TO
RECEIVE INCIDENT LIGHT EXTENDS FROM THE FIRST SIDE
OF THE HOUSING OF THE MOBILE DEVICE
922
```

```
RECEIVE INCIDENT LIGHT BY THE LENS WHILE THE
STRUCTURE IS IN THE EXTENDED STATE
924
```

FIG. 9B

ADJUSTABLE CAMERA SYSTEM

TECHNICAL FIELD

The present disclosure generally relates to camera systems. For example, aspects of the present disclosure relate to an adjustable camera system, such as for mouth tracking.

BACKGROUND

Electronic devices are increasingly equipped with camera hardware to capture images and/or videos for consumption. For example, a computing device can include a camera (e.g., a mobile device such as a mobile telephone or smartphone including one or more cameras) to allow the computing device to capture a video or image of a scene, a person, an object, etc. The image or video can be captured and processed by the computing device (e.g., a mobile device, an IP camera, extended reality device, connected device, advanced driver assist system, etc.) and stored or output for consumption (e.g., displayed on the device and/or another device). In some cases, the image or video can be further processed for effects (e.g., compression, image enhancement, image restoration, scaling, framerate conversion, etc.). Moreover, the image or video can be used in a variety of applications such as computer vision, extended reality (e.g., augmented reality, virtual reality, and the like), object detection, object tracking, image recognition (e.g., face recognition, object recognition, scene recognition, etc.), face tracking, feature extraction, authentication, and automation, among others.

In some cases, an electronic device can process images to detect and/or track objects, faces, and/or any other items depicted in the images. The object detection and/or tracking can be useful for various applications such as, for example, authentication, automation, gesture recognition, surveillance, extended reality, gaming, video conferencing, computer vision, among others. However, the systems and operations implemented for object detection and tracking can have high power and processing demands. The high power and processing demands can create thermal management problems which can negatively impact the computer system implementing such object detection and tracking operations. For example, thermal management problems can have a negative impact on a computer system's stability/reliability, performance, operation, etc.

BRIEF SUMMARY

Systems and techniques are described herein for an adjustable camera system (e.g., for mouth tracking). According to at least one example, a method is provided for using an adjustable camera system for mouth tracking. The method can include moving a structure of a mobile device from a retracted state where at least a portion of the structure is retracted into an opening in a first side of a housing of the mobile device, to an extended state where at least a portion of the structure that includes a lens configured to receive incident light extends from the first side of the housing of the mobile device, wherein one or more surfaces of the housing are configured to engage a head of a user; and receiving incident light by the lens while the structure is in the extended state.

According to at least one example, at least one non-transitory computer-readable medium is provided for using an adjustable camera system for mouth tracking. The at least one non-transitory computer-readable medium can contain instructions which, when executed by one or more processors, cause the one or more processors to move a structure of a mobile device from a retracted state where at least a portion of the structure is retracted into an opening in a first side of a housing of the mobile device, to an extended state where at least a portion of the structure that includes a lens configured to receive incident light extends from the first side of the housing of the mobile device, wherein one or more surfaces of the housing are configured to engage a head of a user; and receive incident light by the lens while the structure is in the extended state.

According to at least one example, an apparatus is provided for using an adjustable camera system for mouth tracking. The apparatus can include means for moving a structure of the apparatus from a retracted state where at least a portion of the structure is retracted into an opening of a housing of the apparatus, to an extended state where at least a portion of the structure that includes a lens configured to receive incident light extends from a first side of the housing of the apparatus, wherein one or more surfaces of the housing are configured to engage a head of a user; and means for receiving incident light by the lens while the structure is in the extended state.

According to at least one example, another apparatus is provided for using an adjustable camera system for mouth tracking. The apparatus can include a housing with an opening formed in a first side of the housing, wherein one or more surfaces of the housing are configured to engage a head of a user; and a structure comprising a lens configured to receive incident light, wherein the structure is configured to move from a retracted state where at least a portion of the structure is retracted into the opening in the first side of the housing, to an extended state where at least a portion of the structure that includes the lens extends from the first side of the housing.

In some examples, the apparatuses described above can include the mobile device. In some cases, a camera sensor is located at a fixed position within the at least one of the housing and the structure. In some examples, the structure can include a light emitter, and the light emitter can be located at a second fixed position within the structure. The second fixed position can be different than the fixed position of the camera sensor. In some cases, a display of the mobile device can emit light in a first direction, and at least a portion of a field-of-emission of the light emitter extends in the first direction.

In some examples, when the structure is in the extended state, the structure extends from the first side of the housing and at an angle relative to a longitudinal axis of the housing.

In some examples, when the structure is in the extended state, the structure extends from the first side of the housing and perpendicular to a longitudinal axis of the housing.

In some cases, the structure is configured to move from the retracted state to the extended state and from the extended state to the retracted state.

In some examples, the housing can include a nose bridge. In some cases, when the structure is in the extended state, an optical axis of the lens or a camera sensor on the structure faces a same direction as light emitted by one or more displays of the mobile device and the structure extends below the nose bridge and relative to a longitudinal axis of the housing.

In some aspects, the method, at least one non-transitory computer-readable medium, and apparatuses described above can detect a mouth depicted in image data captured by a camera sensor on the structure and/or track the mouth depicted in the image data captured by the camera sensor.

In some aspects, the method, at least one non-transitory computer-readable medium, and apparatuses described above can include a locking mechanism configured to hold at least a portion of the structure within the opening of the housing when at least a portion of the structure is in the retracted state, and hold the structure in an extended position relative to the first side of the housing when the structure is in the extended state. In some examples, the locking mechanism can include one or more magnets.

In some aspects, the method, at least one non-transitory computer-readable medium, and apparatuses described above can include a motor that, when activated, extends the structure from the retracted state to the extended state.

In some aspects, the method, at least one non-transitory computer-readable medium, and apparatuses described above can, in response to a trigger, send, to the motor, a signal configured to activate the motor. In some examples, the trigger can include a voice command, a user gesture, an initialization of an application on the apparatus, a user input, and/or a selection of a release element on the housing of the mobile device.

In some aspects, the method, at least one non-transitory computer-readable medium, and apparatuses described above can include a motor that, when activated, retracts the structure from the extended state to the retracted state.

In some aspects, the method, at least one non-transitory computer-readable medium, and apparatuses described above can, in response to a determination that the structure is in the extended state, trigger a camera sensor on the structure to capture image data.

In some aspects, the method, at least one non-transitory computer-readable medium, and apparatuses described above can determine that one or more images captured by a camera sensor on the structure while the structure is in the extended state do not depict a mouth; and based on determining that the one or more images do not depict the mouth and further based on a predetermined position of the camera sensor relative to the housing when the structure is in the extended state, generate a notification indicating that the mobile device and/or the camera sensor is/are misoriented.

In some aspects, the method, at least one non-transitory computer-readable medium, and apparatuses described above can determine that one or more images captured by a camera sensor on the structure while the structure is in the extended state do not depict a mouth; and based on determining that the one or more images do not depict the mouth and further based on a predetermined position of the camera sensor relative to the housing when the structure is in the extended state, turn off or reduce a power mode of the camera sensor.

In some aspects, the method, at least one non-transitory computer-readable medium, and apparatuses described above can detect a mouth depicted in image data captured by a camera sensor on the structure and/or track the mouth depicted in the image data captured by the camera sensor.

In some aspects, the method, at least one non-transitory computer-readable medium, and apparatuses described above can hold, via a locking mechanism, at least a portion of the structure within the opening of the housing when the structure is in the retracted state. In some aspects, the method, at least one non-transitory computer-readable medium, and apparatuses described above can hold the structure in an extended position relative to the first side of the housing when the structure is in the extended state. In some examples, the locking mechanism can include one or more magnets.

In some aspects, the method, at least one non-transitory computer-readable medium, and apparatuses described above can extend, via a motor of the mobile device, the structure from the retracted state to the extended state. In some aspects, the method, at least one non-transitory computer-readable medium and apparatuses described above can, in response to a trigger, send, to the motor, a signal configured to activate the motor. In some examples, the trigger can include a voice command, a user gesture, an initialization of an application on the mobile device, a user input, and/or a selection of a release element on the housing of the mobile device.

In some examples, the structure can include a microphone, an infrared (IR) sensor, a wireless interface, a color sensor, and/or an IR transmitter.

In some aspects, each of the apparatuses described above is, can be part of, or can include a mobile device, a smart or connected device, a camera system, a computer system, an advanced driver assist computer, a robotic system, and/or an extended reality (XR) device (e.g., a virtual reality (VR) device, an augmented reality (AR) device, or a mixed reality (MR) device). In some examples, the apparatuses can include or be part of a vehicle, a mobile device (e.g., a mobile telephone or so-called "smart phone" or other mobile device), a wearable device, a personal computer, a laptop computer, a tablet computer, a server computer, a robotics device or system, an aviation system, or other device. In some aspects, the apparatus includes an image sensor (e.g., a camera) or multiple image sensors (e.g., multiple cameras) for capturing one or more images. In some aspects, the apparatus includes one or more displays for displaying one or more images, notifications, and/or other displayable data. In some aspects, the apparatus includes one or more speakers, one or more light-emitting devices, and/or one or more microphones. In some aspects, the apparatuses described above can include one or more sensors. In some cases, the one or more sensors can be used for determining a location of the apparatuses, a state of the apparatuses (e.g., a tracking state, an operating state, a temperature, a humidity level, and/or other state), and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative examples of the present application are described in detail below with reference to the following figures:

FIGS. 9A and 9B are flowcharts illustrating example processes for processing image data captured by a camera sensor of a structure of a mobile device that has an image sensor and is in an extended state, in accordance with some examples of the present disclosure.

DETAILED DESCRIPTION

Figure 1:
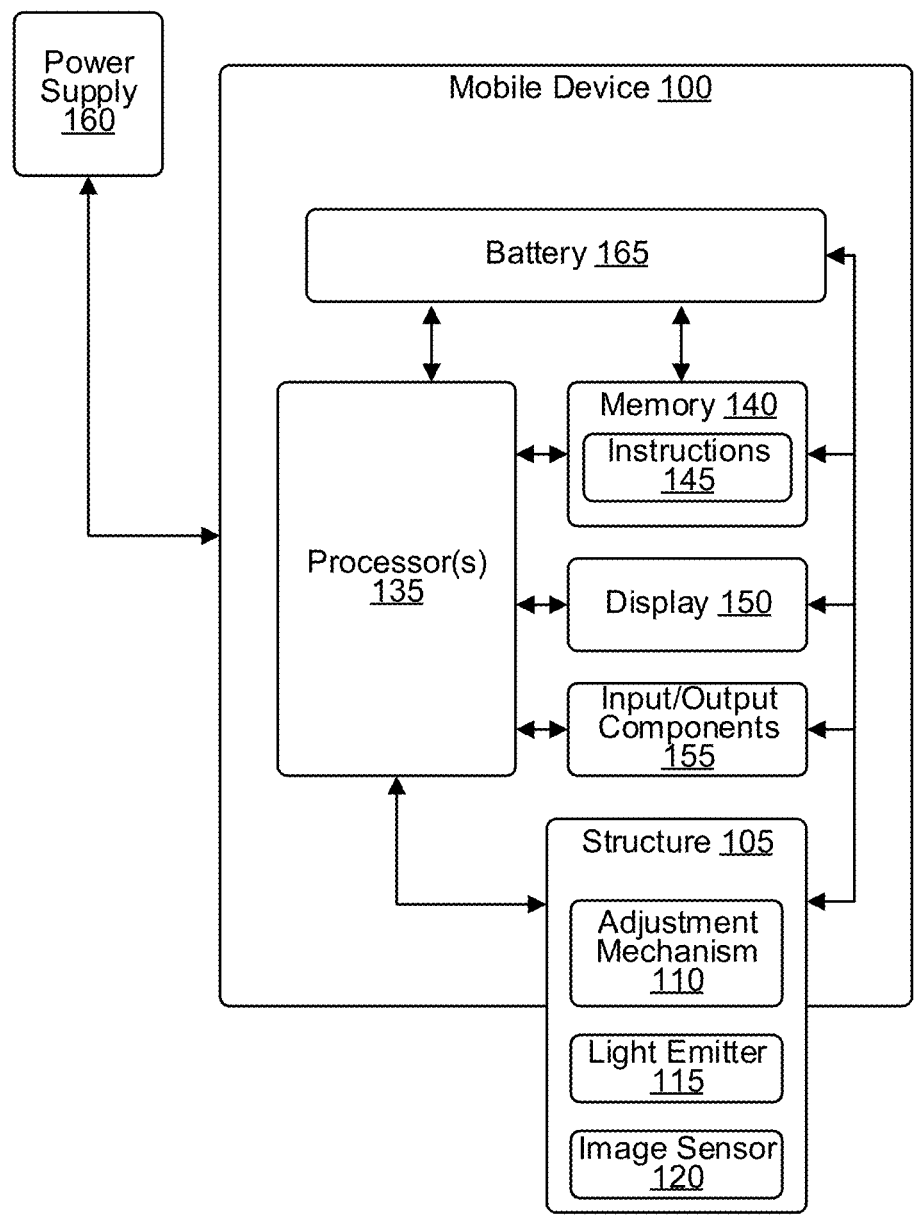
FIG. 1 is a block diagram illustrating a mobile device with a structure that has an image sensor, in accordance with some examples of the present disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

Electronic devices (e.g., advanced driver assistance systems, mobile phones, wearable devices (e.g., smart watches, smart glasses, etc.), computers, extended reality (XR) devices (e.g., virtual reality (VR) devices, passthrough virtual or mixed reality devices, augmented reality (AR) devices, mixed reality (MR) devices, and the like), connected devices, servers, analytics systems, camera systems, etc.) can implement cameras to detect, track, and/or recognize events and/or objects of interest. For example, electronic devices can implement cameras that can capture images of a scene. The images of the scene can be used to detect, track, and/or recognize events and/or objects in the scene. In some examples, an electronic device can implement a video analytics system that can obtain a sequence of video frames from a video source, such as a camera, and process the video sequence to perform a variety of tasks such as, for example, object detection, tracking (e.g., object tracking, face tracking, mouth tracking, eye tracking, eyebrow tracking, device tracking, etc.), object recognition, etc.

Some electronic devices, such as XR devices, can use images or video frames captured by the electronic devices to perform face tracking, mouth tracking, eye tracking, and/or eyebrow tracking. To illustrate, an electronic device such as an XR device can use face tracking data for a variety of tasks and/or use cases such as, for example and without limitation, video conferencing, gaming, projecting an avatar in an XR environment, etc. In some examples, the electronic device can implement a face tracking algorithm that captures/detects eye movements, eyebrow movements, one or more region of the face (e.g., the nose, below the nose and above the lips, the chin, etc.), and/or movements of one or more mouth regions (e.g., top lip, bottom lip, a side(s) of the lips, open mouth regions, etc.). The electronic device can use one or more cameras to capture the face data used by the face tracking algorithm. In some examples, the face data can include mouth tracking (MT) data, eye tracking (ET) data, eyebrow tracking (EBT) data, etc.

Electronic devices are becoming increasingly slimmer and smaller based on the use of more compact technologies. For example, XR devices are becoming increasingly slimmer and smaller using more compact optics technologies. The reduction in size can make it difficult to integrate certain components, such as integrating face tracking cameras in certain positions that can support face tracking algorithms. Moreover, a sub-optimal camera placement on the electronic device may result in a need for software algorithms to offset non-idealities in the captured data. The software algorithms can then increase the computational load on the electronic device. For example, the software algorithms can increase the computational load on the processing device(s) (e.g., the neural processing unit, central processing unit, graphics processing unit, etc.) of the electronic device. Certain sub-optimal camera placements can also lead to poor virtualization of facial features, which can result in unrealistic and/or poor quality results such as, for example, unrealistic avatars, poor face tracking, etc. In many mouth tracking implementations, a compact design of the electronic device may need stereo cameras to capture symmetric mouth expressions from non-ideal angles. This can often require more complicated software algorithms for post processing, which can lead to an increase in the computational load, power consumption, thermal loading, etc.

In some examples, an XR device can include stereo cameras on the front of the XR device for mouth tracking. The stereo cameras can be placed on the XR device such that, when a user wears the XR device, the stereo cameras will be slightly above each cheek of the user. However, such placement of the stereo cameras on the XR device can be less than ideal, and may require extensive software post-processing to track mouth expressions. Moreover, the use of two or more cameras in such implementations can increase the cost of the device and the power consumption of the device. The use of two or more cameras in such implementations can also be more time consuming to calibrate and prone to more pronounced decalibration errors given its reliance on intrinsic and/or extrinsic calibration parameters in stereo matching.

In other examples, an XR device can include external, detachable camera hardware used by the device for mouth tracking. However, the pluggable camera hardware needs to be calibrated on a per-use basis and is subject to decalibration errors based on movements of the attaching structures and/or the camera hardware. The pluggable camera hardware can also move during use and/or can be set-up in different positions relative to the XR device in each set-up instance. Further, the pluggable camera hardware may be heavy and uncomfortable for the user wearing the XR device. In some examples, when the XR device with the pluggable camera hardware is worn by a user and the pluggable camera hardware is extended, there can be a moment and/or torque applied to the XR device and ultimately the user.

In some aspects of the present disclosure, systems, apparatuses, methods (also referred to as processes), and computer-readable media (collectively referred to herein as "systems and techniques") are described for a wearable mobile device (e.g., a head-mounted display, smart glasses, etc.) with an adjustable (e.g., extendable, retractable, etc.) camera structure that includes a camera sensor(s). In some examples, the camera structure can include or can be a camera module, an arm structure, or any other structure that includes a camera sensor(s) and can move (e.g., retract, extend, swing, etc.) from one position to one or more other positions. The wearable mobile device can include a head-mounted display or smart glasses that a user can wear to view and/or interact with XR content. In some cases, the camera structure can include one or more lenses and one or more camera sensors. The camera structure can also include one or more light emitters such as, for example, an illuminator (e.g., an infrared illuminator, a near-infrared illuminator, etc.). In some cases, the camera structure can include one or more additional sensors and/or devices such as, for example and without limitation, a microphone, a wireless interface for wireless communications (e.g., Bluetooth™, WIFI, cellular, near-field communications, etc.), a speaker, an inertial sensor, a motor, an infrared sensor, an RGB sensor, an IR transmitter, etc.

The camera structure can be set to a retracted state when not in use or needed (e.g., when the one or more camera sensors are not in use or needed). In the retracted state, at least a portion of the camera structure can be retracted/recessed within the housing of the wearable mobile device to hide the camera structure (and/or the one or more camera sensors) when not in use. For example, when the camera structure is in the retracted state, at least a portion of the camera structure that includes the one or more camera sensors, one or more lenses, and/or any other components in the camera structure, can be retracted within the housing (or at least partially within the housing) of the wearable mobile device so as to not protrude from the housing and/or so as to provide protective cover for the one or more camera sensors, one or more lenses, and/or any other components in the camera structure when not in use. The camera structure can also be set to an extended state when in use or needed. When a user wears the wearable mobile device and the camera structure is set to the extended state, the one or more camera sensors of the camera structure can capture images of one or more regions of the users face such as, for example, an area(s) of the user's mouth, an area(s) of the user's chin, an area(s) of the user's nose, an area(s) above the user's mouth and below the user's nose, an area including each of the user's cheeks, etc. In some examples, the images captured by the one or more camera sensors when the camera structure is in the extended state can be used by the wearable mobile device to perform mouth tracking.

In the extended state, the camera structure can extend from a bottom of the housing of the wearable mobile device.

In some examples, the camera structure can extend from the bottom of the housing and relative to an axis (e.g., an X axis or longitudinal axis) of the wearable mobile device. For example, the camera structure can extend from a bottom of the housing and locked in a position that is perpendicular (or any other angle) to a surface of the bottom of the housing of the wearable mobile device. In some cases, the camera structure can be manually set to the retracted state and/or the extended state. For example, the user can manually push or pull a portion of the camera structure to set the camera structure to the extended state, and can manually push the camera structure back into the retracted state.

In other cases, the camera structure can include a motor that can set the camera structure to the retracted state and/or the extended state. The motor can be activated/engaged in response to one or more triggers such as, for example and without limitation, a press of a button on the wearable mobile device, a voice command from the user, an input gesture by the user, an input or state of a camera application, a request to use the one or more camera sensors from an application on the wearable mobile device, initiation of a mouth tracking application and/or operation, etc.

When deployed (e.g., when in the extended state), the camera structure can place the one or more camera sensors of the camera structure relative to (e.g., in front of) the mouth of a user wearing the wearable mobile device. The placement of the camera structure when deployed can result in an ideal field of view (FOV) of the one or more camera sensors to allow the one or more camera sensors to image one or more area(s) of the user's mouth, track the user's mouth, and capture mouth expressions with limited or minimal software post processing.

In some examples, the camera structure can include a single camera and can track the user's mouth and capture mouth expressions without requiring pluggable camera hardware or multiple cameras for stereo imaging. Thus, the camera structure can reduce the overall cost of the wearable mobile device by removing the need for more than one camera or a pluggable camera device for mouth tracking. Moreover, the camera structure can reduce the power consumption of the wearable mobile device as a result of needing a single camera and less illumination circuitry to capture regions of the user's mouth. The camera structure can provide an optimal camera placement for mouth tracking applications. For example, when a user wears the wearable mobile device and the camera structure in a deployed state (e.g., set to the extended state), the camera placement can ensure that the user's mouth is within the FOV of the camera of the camera structure. The camera structure can allow for accurate mouth tracking and imaging without increasing the size and thickness of the wearable mobile device.

In some examples, when the camera structure is in the deployed state, the camera placement by the camera structure can also allow the wearable mobile device to implement less complex mouth tracking algorithms and can simplify and/or reduce post processing of image data, thereby reducing the wearable mobile device's computational load, power consumption, thermal load, etc. In some examples, the camera placement can provide a camera view of the inner mouth of the user. In some cases, the camera view of the inner mouth of the user can be direct, and can lead to better tracking and/or reconstruction of the mouth area of the user. In some cases, the camera structure can include one or more processing elements (e.g., a processor, an application-specific integrated circuit, a memory, etc.), which can reduce the thermal load from the rest of the XR device. For example, the camera structure can include a dedicated computer vision application-specific integrated circuit. In this example, the application-specific integrated circuit in the camera module can spread the thermal load from the main housing of the XR device as the camera module can provide added surface area and thus improve heat dissipation.

Various aspects of the application will be described with respect to the figures.

FIG. 1 is a block diagram illustrating a mobile device 100 with a structure 105 that includes a camera, in accordance with some examples of the present disclosure. In some examples, the mobile device 100 can include a wearable computing device such as a head-mounted display (HMD), smart glasses, or any XR device that can be worn on a user's head For example, the mobile device 100 can include a wearable computing device that can be situated relative to the user's face and/or engage the user's face.

The structure 105 can include an image sensor 120 of a camera. The image sensor 120 can include any type of camera sensor. For example, the image sensor 120 can include a video camera sensor, a still image camera sensor, a visible light camera sensor, a thermographic/infrared camera sensor, a near-infrared (NIR) camera sensor, an ultraviolet camera sensor, a night vision camera sensor, a high-frame-rate (HFR) camera sensor, or any combination thereof. The image sensor 120 may include an image sensors of any type such as, for example, a charge-coupled device (CCD) sensor, a complementary metal-oxide semiconductor (CMOS) sensor, a hybrid CCD/CMOS sensor, a quanta image sensor (QIS), and/or any other type of image sensor or any combination thereof.

In some cases, the image sensor 120 may use any type of color filter, including a Bayer filter, a Fujifilm® EXR filter array, a Fujifilm® X-Trans filter, a Quad Bayer filter, a cyan yellow green magenta (CYGM) filter, a red green blue emerald (RGBE) filter, a red yellow yellow blue (RYYB) filter, or any combination thereof. The one or more image sensors of the image sensor 120 may include a layered image sensor array such as the Foveon® X3 sensor or a prism-separated set of image sensors as in a three-CCD (3CCD) camera. The image sensor 120 may use any type of autofocus, such as contrast detection autofocus (CDAF), phase detection autofocus (PDAF), active autofocus, or any combination thereof. The image sensor 120 may include one or more focus pixels for PDAF. The image sensor 120 may use any type of lens, such as a fixed focal length lens, a variable focal length lens, a macro lens, a telephoto lens, a super telephoto lens, a wide angle lens, an ultra-wide angle lens, a fisheye lens, or any combination thereof.

The structure 105 can also include a light emitter 115 configured to emit light. The light can help illuminate areas imaged or recorded by the image sensor 120. The light emitter 115 can be positioned within the structure 105 such that the light emitted by the light emitter 115 at least partially illuminates one or more areas within the field-of-view (FOV) of the image sensor 120. The light emitter 115 can include, for example and without limitation, an illuminator, light-emitting diode (LED), lamp, and/or bulb configured to emit light such as, for example, infrared (IR) light, near infrared light, light in the visible light spectrum, or any combination thereof.

Figure 2A:
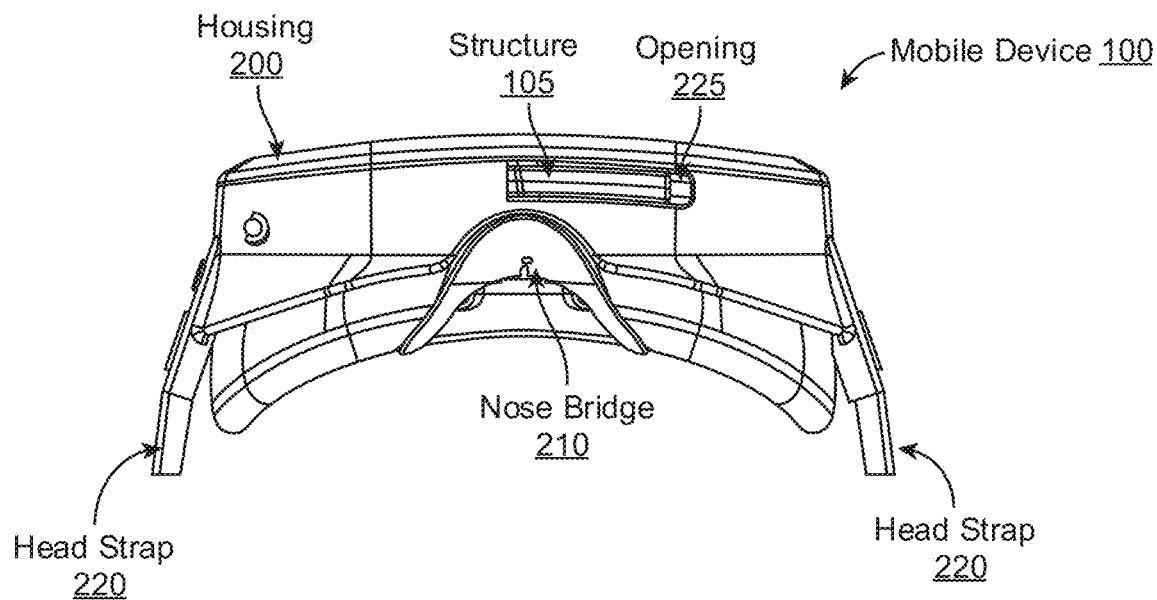
FIG. 2A is a diagram illustrating a view of an example mobile device with a structure that has an image sensor and is in a retracted state, in accordance with some examples of the present disclosure.
Figure 2B:
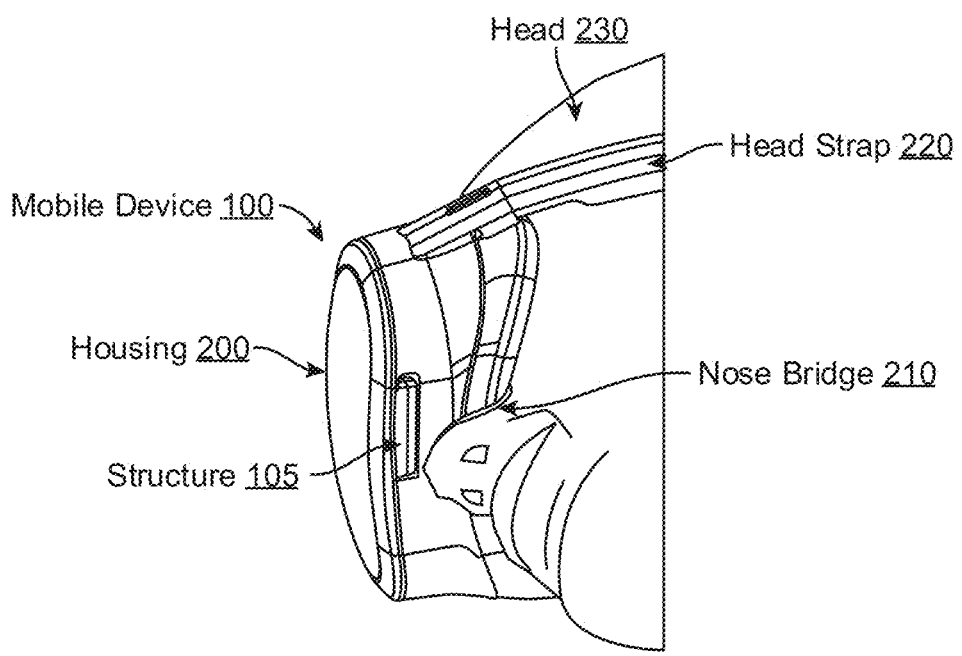
FIG. 2B is a diagram illustrating an example mobile device when worn by a user, in accordance with some examples of the present disclosure.
Figure 6:
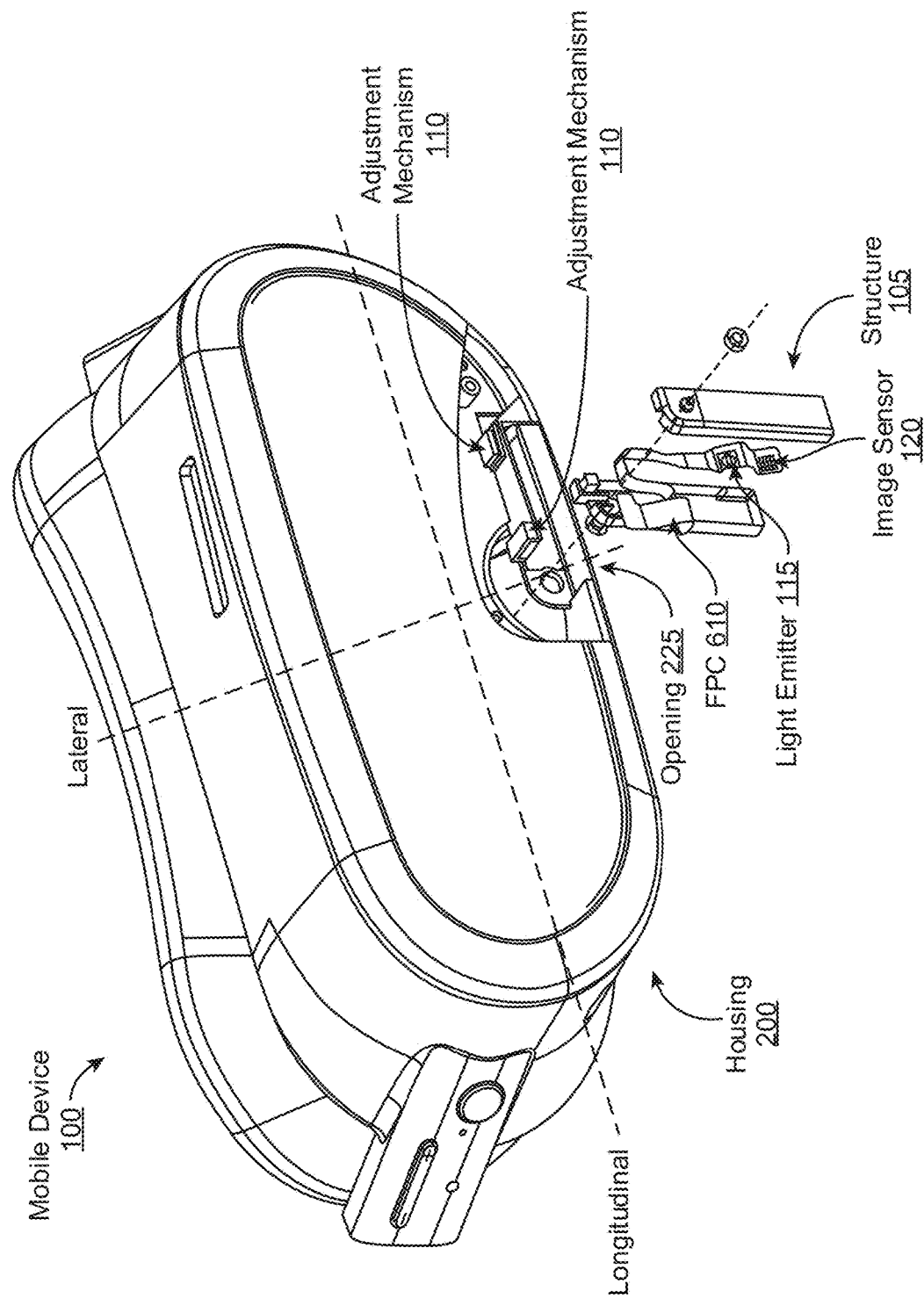
FIG. 6 is a diagram illustrating an example design of a mobile device with an example structure that has an image sensor, in accordance with some examples of the present disclosure.
Figure 7A:
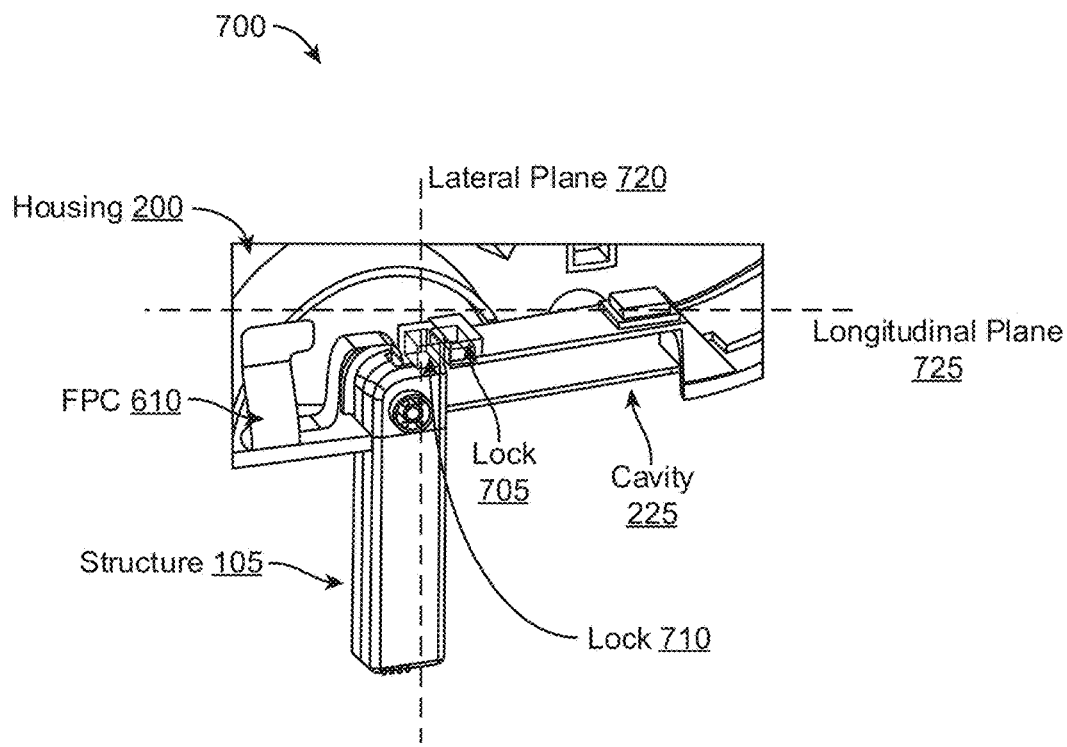
FIG. 7A is a view of an example structure of a mobile device that has an image sensor and is in an extended state, in accordance with some examples of the present disclosure.
Figure 7B:
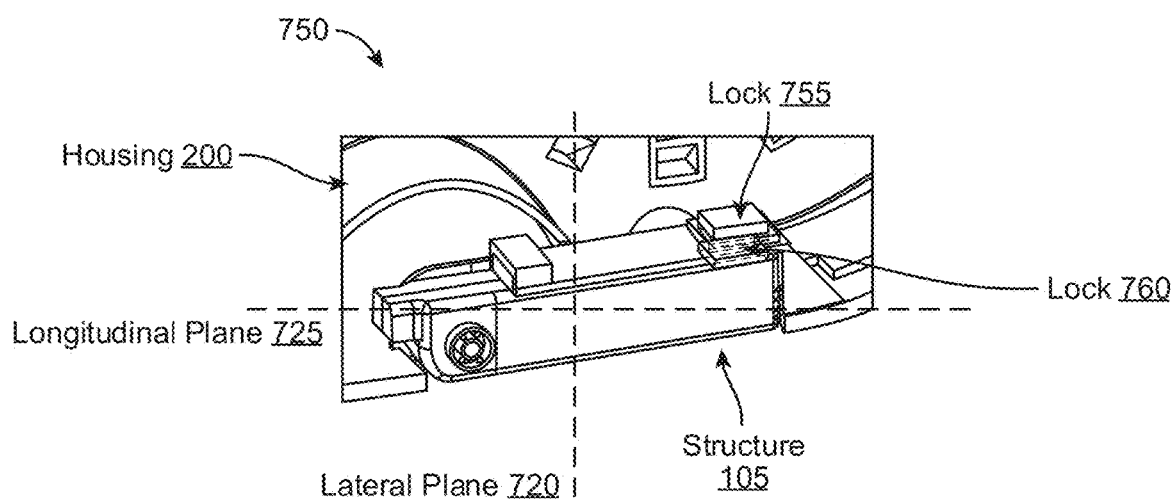
FIG. 7B is a view of an example structure of a mobile device that has an image sensor and is in a retracted state, in accordance with some examples of the present disclosure.

The structure 105 (or a portion of the structure 105) can retract into a housing of the mobile device 100 as illustrated in FIGS. 2A, 2B, and 7B. When the structure 105 is retracted into the housing of the mobile device 100, the structure 105 may be referred to as being in a retracted state. The structure 105 can also extend from the housing of the mobile device 100 as illustrated in FIGS. 3, 4, 5, 6, 7A, and 8. When the structure 105 is extended from the housing of the mobile device 100, the structure 105 may be referred to as being in an extended or deployed state. In some examples, the image sensor 120 of the structure 105 may be configured to capture one or more images while the structure 105 is in the extended state. As described herein, the mobile device 100 can use images captured by the image sensor 120 while the structure 105 is in the extended state (and the mobile device 100 is worn by a user) to track one or more areas of the user's mouth (e.g., a top portion of the mouth, a bottom portion of the mouth, the entire mouth, an inner portion of the mouth, etc.) and/or capture mouth expressions of the user's mouth.

In some examples, the structure 105 can include, can be, or can form a structure that houses the light emitter 115, the image sensor 120, and any other component of the structure 105 described herein. In some examples, the structure 105 can include or can be an arm structure that houses the light emitter 115 and the image sensor 120 (and any other component of the structure 105), and can move between the retracted state and the extended state. For example, in some cases, the structure 105 can include or can be an arm structure that houses the light emitter 115 and the image sensor 120 (and any other component of the structure 105) and can swing between the retracted state and the extended state. In some examples, the structure 105 can include one or more processing elements such as, for example and without limitation, an image signal processor (ISP), a digital signal processor (DSP), an application-specific integrated circuit, a central processing unit (CPU), a graphics processing unit (GPU), a memory, or any combination thereof The structure 105 may include an adjustment mechanism 110 configured to hold or lock the structure 105 in the retracted state and/or the extended state. In some cases, the adjustment mechanism 110 can move the structure 105 from the retracted state to the extended state and/or from the extended state to the retracted state. For example, the adjustment mechanism 110 may push or pull the structure 105 from the retracted state to the extended state. The adjustment mechanism 110 may alternately or additionally push or pull the structure 105 from the extended state to the retracted state. In some examples, the adjustment mechanism 110 can include one or more locks to hold the structure 105 in the retracted state when the structure 105 is retracted, and/or hold the structure 105 in the extended state when the structure 105 is deployed/extended. The one or more locks can include any type of locks such as, for example and without limitation, a magnetic lock, an electric lock, a mechanical lock, and/or any other type of lock or combination thereof.

For example, in some cases, the adjustment mechanism 110 can include one or more magnets such as, for example, a permanent magnet, a ferromagnet, an electromagnet, or any combination thereof. The magnets may be used to attract or repel other magnets or ferromagnetic materials to provide a magnetic pushing or pulling force used by the adjustment mechanism 110 to hold the structure 105 in the retracted state when retracted, and/or the extended state when deployed/extended. In some cases, the adjustment mechanism 110 may include one or more springs. The one or more springs may include one or more compression springs and/or one or more tension springs.

In some cases, the adjustment mechanism 110 can include one or more motors (not shown). The adjustment mechanism 110 can use the one or more motors to move one or more components of the adjustment mechanism 110, such as one or more gears or pulleys. The motorized components may, in some cases, directly move the structure 105 between the retracted state and the extended state. The motorized components may, in some cases, indirectly allow the structure 105 to move between the retracted state and the extended state. For example, the motorized components may indirectly allow the structure 105 to move between the retracted state and the extended state by moving an occlusion from a first position to a second position. In the first position, the occlusion may prevent a pushing or pulling force of a spring or magnet from moving the structure 105 by occluding the path of the structure 105. In the second position, the occlusion may no longer occlude the path of the structure 105, and therefore allow the pushing or pulling force of the spring or magnet to move the structure 105.

In some cases, the structure 105 can include one or more motors that may be used to move portions of the structure 105 to help point one or more optical components in the structure 105 (e.g., a lens, image sensor 120, etc.) in different directions. For example, the adjustment mechanism 110 can use the one or more motors to initiate and/or effect a folding or unfolding of the structure 105. In some examples, the structure 105 can include a lens configured to receive incident light that can be moved or repositioned based on the extending and retracting of the structure 105. In some cases, the image sensor 120 can be located at a fixed position in a housing of the mobile device, and the structure 105 can include folded optics to direct light from a lens on the structure 105 towards the image sensor 120 on the housing of the mobile device.

Figure 10:
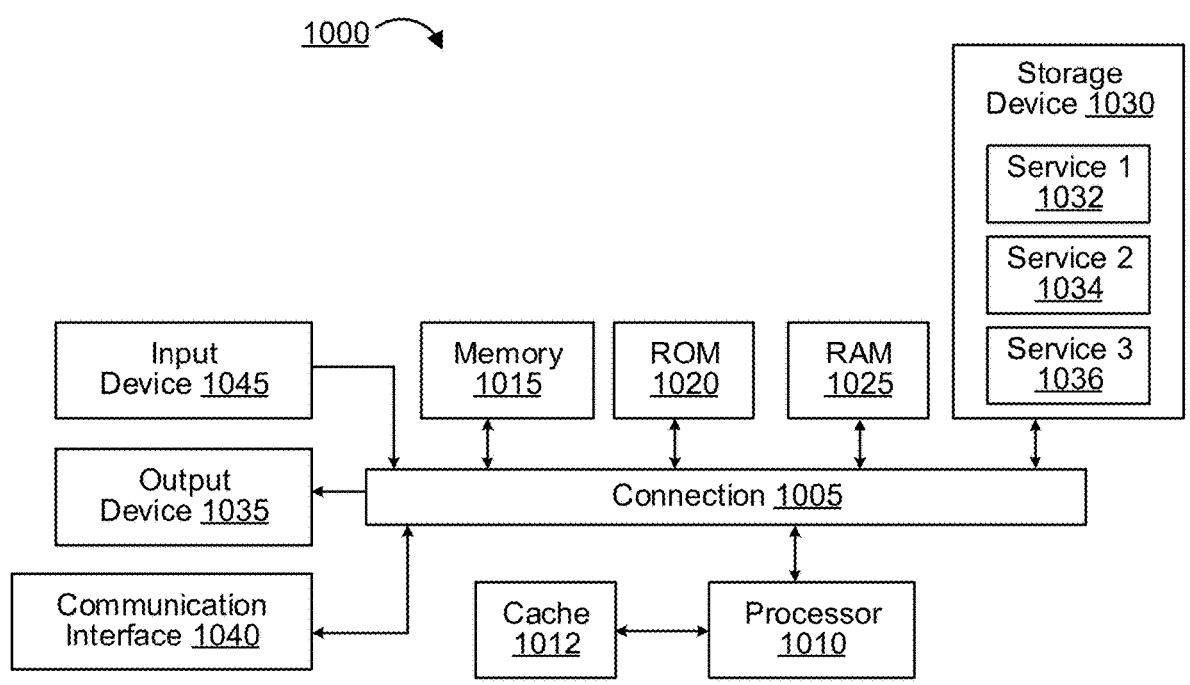
FIG. 10 illustrates an example computing device architecture, in accordance with some examples of the present disclosure.

The mobile device 100 can include a computing system, such as computing system 1000 illustrated in FIG. 10. The mobile device 100 can include one or more processors 135. The one or more processors 135 can be or include any type of processor, such as any type of processor discussed with respect to the processor 1010 of FIG. 10. In some examples, the one or more processors 135 can include at least one ISP, at least one DSP, at least one CPU, at least one GPU, or any combination thereof.

The mobile device 100 can include memory 140 for storing data. The memory 140 can include one or more memory and/or storage media components. Each of the one or more memory and/or storage media components may include any type of memory (e.g., memory 1015 shown in FIG. 10), read-only memory (ROM) (e.g., ROM 1020 shown in FIG. 10), random-access memory (RAM) (e.g., RAM 1025 shown in FIG. 10), cache (e.g., cache 1012 shown in FIG. 10), storage device (e.g., storage device 1030 shown in FIG. 10), another type of non-transitory computer-readable storage medium, or any combination thereof. The memory 140 may store instructions 145, which may be executed by the one or more processors 135 to perform various operations, such as processing of images from the image sensor 120 of the structure 105 to track one or more areas of a user's face, capture mouth expressions, etc.

The mobile device 100 can include a display 150. The display 150 can include, for example, a liquid crystal display (LCD), a plasma display, an organic light-emitting diode (OLED) display, a low-temperature poly-silicon (LTPO) display, an electronic ink or "e-paper" display, a projector-based display, a holographic display, another suitable display device, or any combination thereof. The display 150 can output (e.g., display) images and/or video frames captured by the image sensor 120 of the structure 105, images and/or video frames generated by the one or more processors 135, and/or images and/or video frames received by the mobile device 100 from a separate device.

The mobile device 100 can include one or more input/output (I/O) components 155. The I/O components 155 can include, for example, one or more physical buttons, one or more touch-sensitive screens or other surfaces, any input devices (e.g., input device 1045 discussed with respect to FIG. 10), any output devices (e.g., output device 1035 discussed with respect to FIG. 10), or any combination thereof. In some examples, the mobile device 100 can include a battery 165 to provide power to the mobile device 100. In some cases, the mobile device 100 can be connected to an external power supply 160, such as a power outlet or an external battery or generator. Power to the mobile device 100 can be provided by the battery 165 and/or the power supply 160. For example, the battery 165 and/or the power supply 160 can provide power to the one or more processors 135, the one or more I/O components 155, the display 150, the memory 140, the image sensor 120 of the structure 105, the light emitter 115, the adjustment mechanism 110, or any combination thereof. Though not illustrated in FIG. 1, the mobile device 100 may also include a communication interface (e.g., communication interface 1040 shown in FIG. 10) or any other components illustrated in, and discussed with respect to, FIG. 10.

FIG. 2A is a diagram illustrating a view of the mobile device 100 with the structure 105 in a retracted state. In this example, the mobile device 100 is an HMD device that can be worn on a user's head. The mobile device 100 can include a display (e.g., display 150) for displaying content to a user wearing the mobile device 100.

As shown, the mobile device 100 includes a housing 200 containing the electronic components of the mobile device 100. In some cases, the mobile device 100 can also include a nose bridge 210 configured to sit on a portion of a user's nose when the user wears the mobile device 100. When the mobile device 100 is worn by the user, the nose bridge 210 can provide support for the mobile device 100, stability for the mobile device 100, and/or adjustment/fitting flexibility. In some cases, the mobile device 100 can include a head strap 220. The user can use the head strap 220 to mount and/or secure the mobile device 100 on the user's head. The head strap 220 can provide support and/or stability for the mobile device 100 when worn by the user. In some examples, the head strap 220 can be adjustable to accommodate different head sizes/shapes and/or wearing preferences (e.g., tightness, firmness, looseness, position, and/or any other fitting preferences). The head strap 220 can include a single strap or multiple straps.

In some cases, the housing 200 and/or the structure 105 can include one or more sensors. In some examples, the one or more sensors can be used to determine movement of the mobile device 100 relative to a head of a user wearing the mobile device 100. For example, the nose bridge 210 can include a touch sensor that can detect physical touch and can be used to determine whether the housing 200 and/or nose bridge 210 is sliding from one position relative to the user's head to another position relative to the user's head. A determination that the housing 200 and/or nose bridge 210 is sliding can be used to understand field-of-view adjustments of the extended camera on the structure 105 for improved mouth tracking and/or processing.

The housing 200 can include an opening 225 to receive the structure 105 when the structure 105 is in the retracted state. In some cases, the opening 225 can be located on a bottom portion of the housing 200. For example, the opening 225 can be located on the same side of the housing 200 (and/or on a same plane) as the nose bridge 210. In some cases, a length of the opening 225 can be at least as long as the structure 105 (e.g., in the longitudinal direction) so as to allow the structure 105 to be contained within the opening 225 in a horizontal disposition/placement (e.g., relative to the bottom of the housing 200). In some cases, the structure 105 can rotate or swing from an extended state into the opening 225 to place the structure 105 in the retracted state. In such cases, when the structure 105 is in the retracted state, the structure 105 can sit horizontally (e.g., along a same plane as the nose bridge 210 and/or the bottom of the housing 200) within the opening 225.

In other cases, the opening 225 can be sufficiently deep so as to allow the structure 105 to be inserted/receded lengthwise into the opening 225. For example, the opening 225 can be configured to fully or at least partially contain the structure 105 in the direction of the length of the structure 105 (e.g., longitudinally). In some examples, the structure 105 can be pushed or pulled into the opening 225 in a longitudinal direction, and the opening 225 can contain the structure 105 in the longitudinal direction when the structure 105 is in the retracted state.

In other cases, the structure 105 can be attached to an exterior portion of the housing 200. For example, the structure 105 can be attached to a bottom or front portion of the housing 200. In some examples, the structure 105 can have telescoping capabilities that allow the structure 105 to slide and/or switch between a fixed retracted position and a fixed extended position. To illustrate, the structure 105 can be attached to a bottom or front portion of the housing 200 and slide into a fixed retracted position when the image sensor 120 of the structure 105 is not in use or needed, and can slide into a fixed extended position when the image sensor 120 is in use or needed.

In some examples, the structure 105 can include a lens configured to receive incident light that can be moved or repositioned based on the extending and retracting of the structure 105. In some cases, the image sensor 120 can be located at a fixed position in a housing of the mobile device, and the structure 105 can include folded optics to direct light from an incident lens on the structure 105 towards the image sensor on the housing of the mobile device.

In some cases, the housing 200 can provide a receptacle configured to receive a mobile device or handset. For example, the housing 200 can include a receptacle to allow a mobile device to be snapped into the housing 200. This can allow a user to wear the housing 200 with the mobile device in the receptacle on the user's head.

FIG. 2B is a diagram illustrating the mobile device 100 when worn by a user. In this example, the structure 105 is in the retracted state. The mobile device 100 is secured to the head 230 of the user by the head strap 220. The nose bridge 210 can sit on a nose of the user to provide further support, stability, padding, comfort, adjustment, etc. When the structure 105 is in the retracted state, the structure 105 can be contained fully or at least partially within the opening 225. As further described herein, the structure 105 can be extended from the retracted state (e.g., from the opening 225) to an extended state to allow the image sensor 120 of the structure 105 to capture images or video frames of the user's mouth region. In the extended state, the image sensor 120 of the structure 105 can be positioned such that the mouth region of the user is within the FOV of the image sensor 120.

Figure 3:
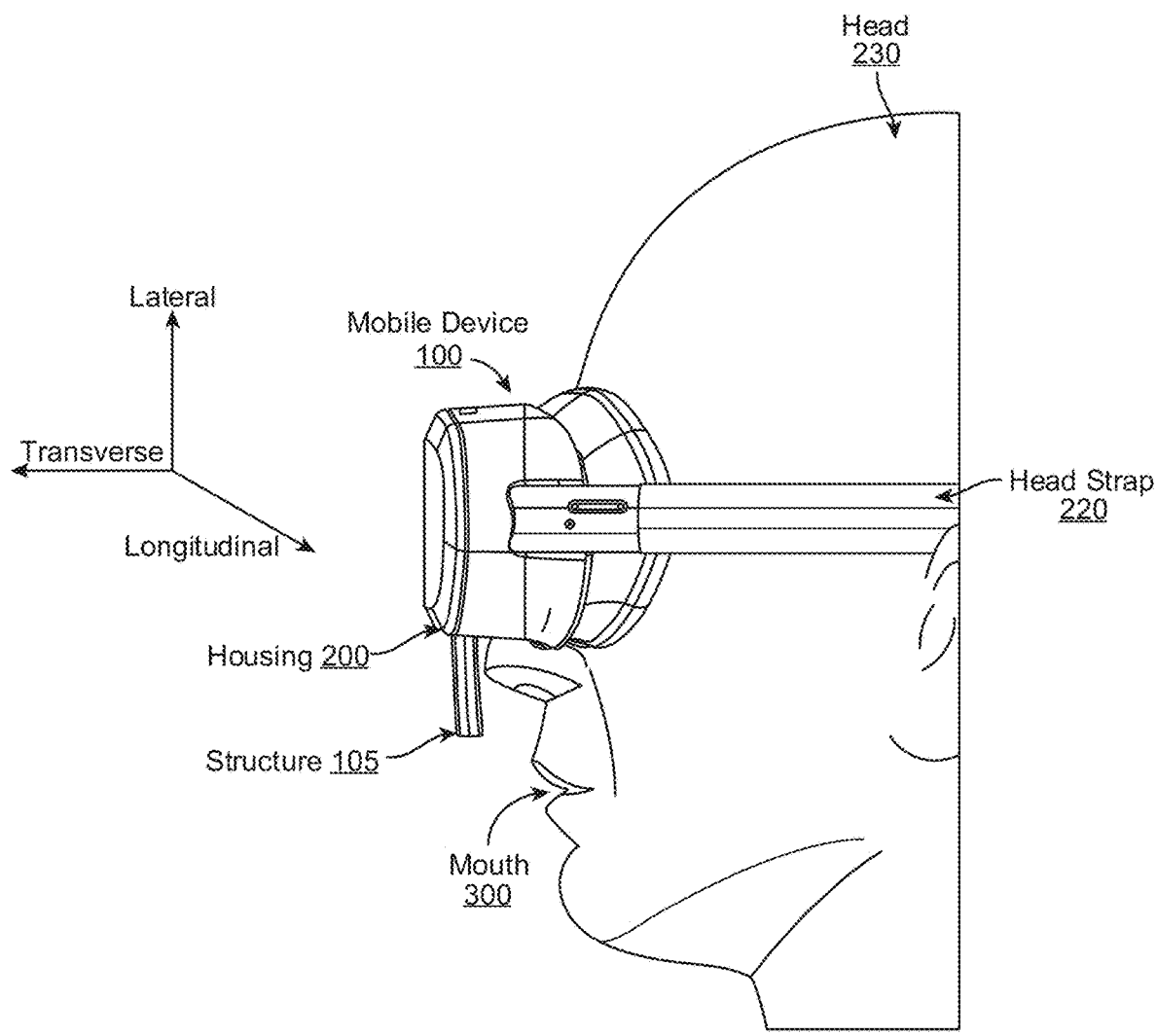
FIG. 3 is a diagram illustrating an example mobile device that has a structure with an image sensor and is worn by a user when the structure is in an extended state, in accordance with some examples of the present disclosure.

FIG. 3 is a diagram illustrating the mobile device 100 worn by a user with the structure 105 in an extended state. As shown, in the extended state, the structure 105 can extend from the opening 225 on the bottom of the housing 200 of the mobile device 100. In some examples, the structure 105 can extend along a lateral plane of the housing 200 of the mobile device 100. In some cases, when the structure 105 is in the extended state, the structure 105 can be extended/positioned perpendicular to a longitudinal axis of the housing 200 of the mobile device 100.

In the extended state, the position/placement of the image sensor 120 of the structure 105 can place the mouth 300 of the user within the FOV of the image sensor 120 of the structure 105. This can allow the image sensor 120 to capture images and/or video frames of the mouth 300, detect movements of the mouth 300, detect gestures, expressions, etc., of the mouth 300, track the mouth 300, etc. In some cases, when the structure 105 is in the extended state, the position/placement of the image sensor 120 of the structure 105 can place one or more other regions of the user's face within the FOV of the image sensor 120. For example, when the structure 105 is in the extended state, the position/placement of the image sensor 120 of the structure 105 can place the chin (or a portion thereof) of the user, a portion of the nose of the user, an area below the nose of the user and above the mouth 300, a portion of a cheek or both cheeks of the user, and/or an inside of the mouth 300 within the FOV of the image sensor 120.

As previously mentioned, in some cases, the structure 105 can include other devices and/or sensors. For example, the structure 105 can include a microphone. In this example, when the structure 105 is in the extended state, the microphone can be positioned relative to the mouth 300 to help the microphone capture sound from the mouth 300 (e.g., talking, voice commands, etc.) and/or improve the quality of the sound captured from the mouth 300. To illustrate, when the structure 105 is in the extended state, the microphone can be positioned closer to the mouth 300 (e.g., closer than the housing 200) to improve the ability of the microphone to capture sound from the mouth 300 and/or improve the quality of the sound from the mouth 300 captured by the microphone.

In some cases, the mobile device 100 can use signals from the microphone to automatically extend or retract the structure 105. For example, a signal from the microphone can indicate that the user is speaking. The mobile device 100 can use the signal from the microphone to determine that the user is speaking and, in response, the mobile device 100 can automatically move the structure 105 to the extended state (e.g., via an adjustment mechanism such as a motor). The mobile device 100 can use the microphone to detect silence and, in response to detecting silence, the mobile device 100 can retract the structure 105 to the retracted state. In other examples, the mobile device 100 can use one or more sensors to detect certain expressions, which the mobile device 100 can use to move the structure 105 to the extended state or the retracted state. For example, the mobile device 100 can use one or more image sensors to detect movement and/or expressions of the user's mouth 300 and/or face, and move the structure 105 in response to the detected movement and/or expressions.

In some cases, when the structure 105 is in the extended state, the mobile device 100 can detect whether the mobile device 100 is properly worn by the user (e.g., properly oriented/positioned) and/or whether the image sensor 120 is properly oriented/positioned. For example, if the mobile device 100 processes an image or video frame captured by the image sensor 120 and determines that the image or video frame does not include the mouth 300 and instead includes something other than the mouth 300, the mobile device 100 can notify the user (e.g., visually by presenting a notification on a display of the mobile device 100 and/or via an audio notification generated by a speaker of the mobile device 100) that the mobile device 100 and/or the image sensor 120 is/are not properly oriented/positioned.

To illustrate, since the image sensor 120 can have a fixed position relative to the housing 200 when the structure 105 is in the extended state, the mobile device 100 can expect that images or video frames captured by the image sensor 120 will include the mouth 300 (or a portion thereof) if the structure 105 is in the extended state and the mobile device 100 is properly worn and oriented/positioned. Accordingly, if the mobile device 100 processes an image or video frame captured by the image sensor 120 and detects the user's forehead in the image or video frame captured by the image sensor 120, the mobile device 100 can notify the user that the mobile device 100 and the image sensor 120 are not properly oriented/positioned. In some examples, the notification from the mobile device 100 can include instructions for correcting the orientation/position of the mobile device 100 and/or the structure 105. For example, if the mobile device 100 determines that an image or video frame captured by the image sensor 120 includes the user's forehead, the mobile device 100 can notify the user that the mobile device 100 is upside down and/or instruct the user to flip the mobile device 100 so it is not upside down.

In some examples, the notification from the mobile device 100 can include a recommended action that the user can perform. For example, the notification can suggest that the image sensor 120 be turned off and/or the structure 105 be moved to the retracted state to avoid unnecessary power consumption by the image sensor 120 while the image sensor 120 is unable to capture images or video frames of the mouth 300 (e.g., because of the incorrect orientation/position of the mobile device 100 and/or the structure 105). In some cases, the mobile device 100 can automatically perform a recommended action when it detects that the mobile device 100 and/or the structure 105 is/are improperly oriented/positioned. For example, the mobile device 100 can automatically turn off the image sensor 120 and/or move the structure 105 to the retracted state to avoid unnecessary power consumption by the image sensor 120 while the image sensor 120 is unable to capture images or video frames of the mouth 300 (e.g., because of the incorrect orientation/position of the mobile device 100 and/or the structure 105).

As another example, if the mobile device 100 determines that the image sensor 120 is unable to capture images or video frames of the mouth 300 for any other reason, the mobile device 100 can notify the user, provide an instruction or recommendation to the user as previously described, or automatically perform an action such as turning off the image sensor 120, moving the structure 105 to the retracted state, etc. To illustrate, if the image sensor 120 is unable to capture images or video frames of the mouth 300 because the user is wearing a face mask, the mobile device 100 can notify the user that the image sensor 120 is unable to image or track the mouth 300, instruct (or recommend) the user to remove the face mask, automatically turn off the image sensor 120, and/or automatically move the structure 105 to the retracted state.

Figure 4:
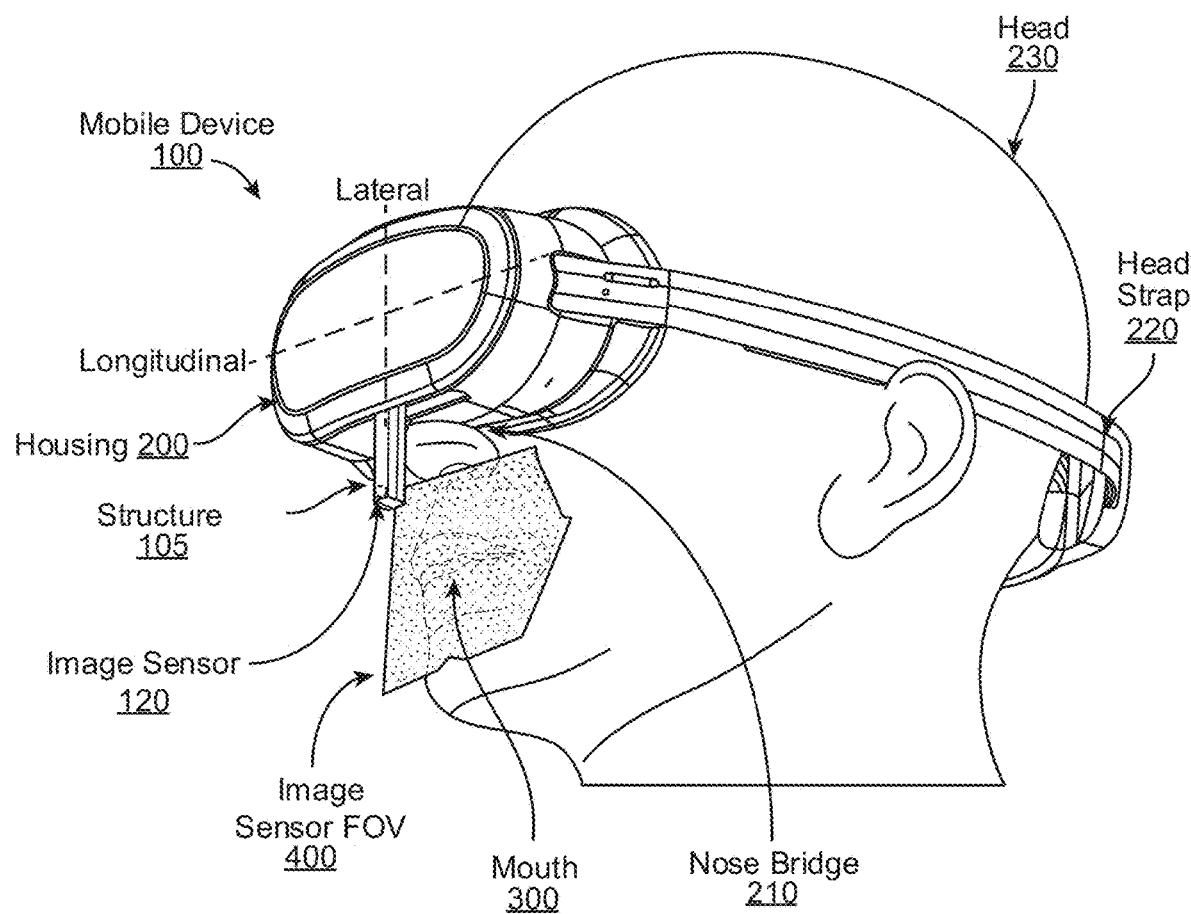
FIG. 4 is a diagram illustrating an example field-of-view of an example image sensor of a structure when the structure is in an extended state, in accordance with some examples of the present disclosure.

FIG. 4 is a diagram illustrating an example FOV of the image sensor 120 of the structure 105 when the structure 105 is in the extended state. The structure 105 can extend from a bottom of the housing 200 to allow the image sensor 120 to capture images and/or video frames of the mouth 300 of the user. In some examples, the structure 105 can extend along a lateral plane of the housing 200 of the mobile device 100. In some cases, when the structure 105 is in the extended state, the structure 105 can be positioned perpendicular (or substantially perpendicular) to a longitudinal plane of the housing 200.

Moreover, when the structure 105 is in the extended state, the image sensor 120 can have a view of the mouth 300 of the user wearing the mobile device 100. The image sensor 120 can be positioned facing the mouth 300 of the user to have the view of the mouth 300 of the user. In some examples, the image sensor 120 can be positioned in front of the mouth 300 of the user and facing the mouth 300 of the user. In other examples, the image sensor 120 can face the mouth 300 of the user from a position above the mouth 300 of the user.

As shown, the extended state of the structure 105 can place the mouth 300 of the user within the FOV 400 of the image sensor 120 of the structure 105. In other words, when the structure 105 is in the extended state, the FOV 400 of the image sensor 120 can include the mouth 300 of the user. In some cases, the FOV 400 of the image sensor 120 can also include other areas of the face of the user such as, for example, the chin of the user (or an area thereof), an area below the nose and above the mouth 300 of the user, a portion(s) of the cheeks of the user's face, an inside of the mouth 300, etc. In some cases, the lens of the image sensor 120 can be rotated to provide a different FOV, such as a forward-looking FOV for example.

When the structure 105 is in the extended state, the image sensor 120 can capture images and/or video frames of the mouth 300 of the user (as well as other areas of the face of the user as previously described). The mobile device 100 can use the captured images and/or video frames from the image sensor 120 to perform mouth tracking. In some examples, the mobile device 100 can use the captured images and/or video frames from the image sensor 120 to detect and/or recognize movements and/or expressions of the mouth 300 and/or other portions of the user's face such as the chin, the cheeks, a region above the mouth 300, etc.

In some examples, the image sensor 120 can be automatically initialized, triggered, and/or engaged when the structure 105 is in the extended state. In other examples, the image sensor 120 can be triggered when the light emitter 115 and/or another system component is initialized or triggered. In some cases, the image sensor 120 can be triggered to capture image data by a camera application or any other application of the mobile device 100 such as, for example, an XR application, a video collaboration application, a facial avatar application, a gaming application, a system application, a light emitter application, and/or any other application or process on the mobile device 100. In some cases, the image sensor 120 can be triggered by movements and/or gestures of the mouth 300. For example, the image sensor 120 can detect a movement and/or gesture of the mouth 300, which can trigger the image sensor 120 to initialize and/or capture image data.

In some cases, the image sensor 120 can be manually triggered by the user to capture image data. For example, the user can press a physical button on the mobile device 100 (e.g., on the housing 200) or select a virtual button displayed by a display of the mobile device 100 to trigger the image sensor 120 to capture image data. As another example, the user can use voice commands and/or gestures to trigger the image sensor 120 to capture image data.

In some examples, the image sensor 120 can be pre-calibrated based on the relative poses of the housing 200 and the image sensor 120 when the structure 105 is in the extended state. For example, the position of the image sensor 120 (e.g., relative to the pose of the housing 200)

when the structure 105 is in the extended state can be used to calibrate the image sensor 120 to allow the mobile device 100 to accurately track the mouth 300 of the user based on images and/or video frames captured by the image sensor 120 when the structure 105 is in the extended state. To illustrate, the position of the image sensor 120 and/or an optical element (e.g., a lens, etc.) associated with the image sensor 120 (e.g., relative to the housing 200) when the structure 105 is in the extended state can be used to calibrate the image sensor 120 to allow the mobile device 100 to accurately track the mouth 300 of the user based on images and/or video frames captured by the image sensor 120. In some cases, the image sensor 120 and/or one or more optical components associated with the image sensor 120 (e.g., a color filter array, an incident lens, a focusing lens, and/or any other optical component) can have a fixed position relative to the housing 200 when the structure 105 is in the extended state. The fixed position of the image sensor 120 and/or the one or more optical components can be used to calibrate the image sensor 120 for tracking of the mouth 300.

In some cases, the image sensor 120 can additionally or alternatively be calibrated based on the position of the image sensor 120 and/or one or more optical components associated with the image sensor 120 (e.g., a color filter array, an incident lens, a focusing lens, and/or any other optical component) when the structure 105 is in the extended state and an estimated location (or location ranges) of the mouth 300 of the user relative to the position of the image sensor 120. In some examples, the image sensor 120 can be calibrated based on the position of the image sensor 120 and/or one or more optical components associated with the image sensor 120 when the structure 105 is in the extended state and the average location (or location ranges) of a reference point in a human face (e.g., human mouths, human chins, etc.) relative to the position of the image sensor 120 and/or the one or more optical components. In some cases, the average location (or location ranges) of the reference point in a human face (e.g., human mouths, human chins, etc.) can be determined based on the average size and/or shape of a human head, the average size and/or shape of the human mouth, the average distance between two or more points on a human face (e.g., mouth and chin, mouth and nose, nose and chin, the cheeks, the eyes and mouth, a point of the head 230 and the mouth, etc.), and/or the average size and/or shape of any other facial regions.

In some cases, the depth from the mouth 300 to the image sensor 120 and/or one or more optical components associated with the image sensor 120 when the structure 105 is in the extended state can be calibrated. In some examples, the depth from the mouth 300 to the image sensor 120 and/or the one or more optical components when the structure 105 is in the extended state can be estimated and used to pre-calibrate the image sensor 120. In some cases, the image sensor 120 can be calibrated based on intrinsic parameters of the image sensor 120 (e.g., one or more parameters of the image sensor 120, the optics that are intrinsic to the image sensor 120, etc.), as well as extrinsic parameters of the image sensor 120 (e.g., where the image sensor 120 and/or one or more optical components associated with the image sensor 120 are situated relative to the housing 200 when the structure 105 is in the extended state).

The calibration of the image sensor 120 can help the mobile device 100 more accurately track the mouth 300 of a user based on images and/or video frames captured by the image sensor 120 when the structure 105 is in the extended state. As previously explained, in some examples, the image sensor 120 and/or one or more optical components associated with the image sensor 120 can have a fixed position when the structure 105 is in the extended state. The fixed position can prevent (or limit) the need to recalibrate the image sensor 120 for a particular user and/or the need to recalibrate the image sensor 120 multiple times or more frequently (e.g., before each use, after a number of uses, after a period of time, from user to user, etc.).

In some examples, when placing the structure 105 in the extended state, the position of the structure 105 can be dynamic based on the size and/or shape of the user's face. For example, the degree of extension of the structure 105 or the end position of the structure 105 when placed in the extended state can be dynamic based on an analysis of the size and/or shape of the user's face. To illustrate, a user may have a more elongated face than other users or the average user. The mobile device 100 can analyze the size and shape of the user's face and determine that the user has a more elongated face. Based on the determination that the user has a more elongated face, the mobile device 100 can dynamically determine the degree of extension of the structure 105 in the extended state and/or the end position of the structure 105 when placed in the extended state.

In some cases, the degree of extension of the structure 105 or the end position of the structure 105 when placed in the extended state can change based on the application or use case of the structure 105. For example, the degree of extension and/or end position of the structure 105 when placed in the extended state in a use case for audio collection by a microphone on the structure 105 can be different than in a use case for imaging the face cheeks of the user (e.g., for expression monitoring, etc.) by the image sensor 120 of the structure 105). In some cases, in use cases involving both audio collection and imaging of the face cheeks of the user, the degree of extension and/or end position of the structure 105 when placed in the extended state can be different than in use cases for audio collection or imaging the face cheeks of the user. For example, in use cases involving both audio collection and imaging of the face cheeks of the user, the degree of extension and/or end position of the structure 105 when placed in the extended state can result in an end position that is somewhere in-between the end position for audio collection and face cheek imaging uses cases, directly in front of the mouth 300 of the user, or higher for imaging the face cheeks of the user.

Figure 5:
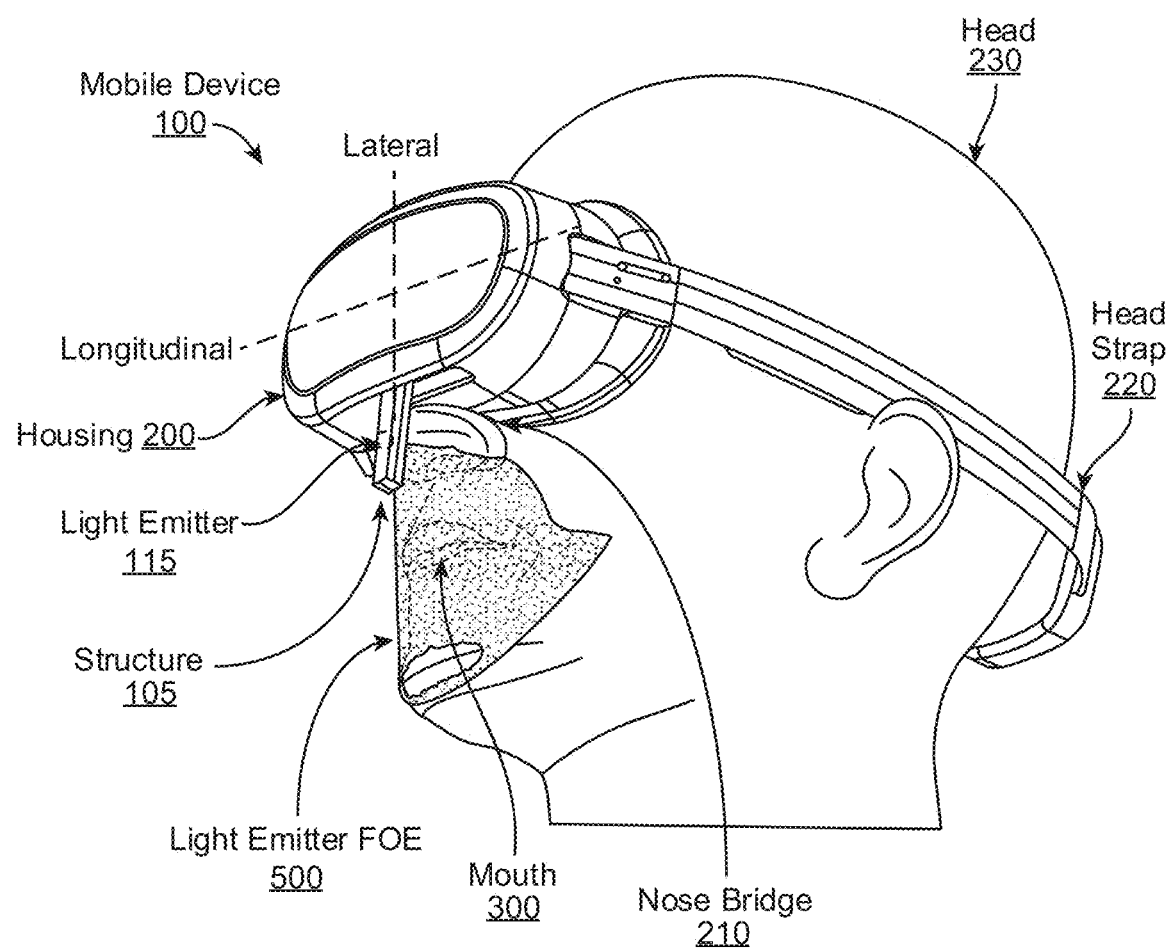
FIG. 5 is a diagram illustrating an example field-of-emission (FOE) of an example light emitter of a structure of a mobile device when the structure is in an extended state, in accordance with some examples of the present disclosure.

FIG. 5 is a diagram illustrating an example field-of-emission (FOE) 500 of the light emitter 115 of the structure 105 when the structure 105 is in the extended state. The FOE 500 represents the light coverage of the light emitter 115 when the structure 105 is in the extended state. In other words, the FOE 500 represents the area illuminated by the light emitter 115 when the structure 105 is in the extended state.

When the structure 105 is in the extended state, the light emitter 115 can illuminate areas of the face of the user wearing the mobile device 100, including the mouth 300, to help the image sensor 120 capture images and/or video frames of the mouth 300 of the user (as well as other areas of the face of the user as previously described). As shown in FIG. 5, the extended state of the structure 105 can place the mouth 300 of the user within the FOE 500 of the light emitter 115 of the structure 105. In other words, when the structure 105 is in the extended state, the FOE 500 of the light emitter 115 can include the mouth 300 of the user. Thus, the light emitter 115 can illuminate the areas of the user's face being imaged or recorded by the image sensor 120. This can improve the quality of the image data captured by the image sensor 120, as well as the tracking of the mouth 300 by the mobile device 100 (and/or detection and/or recognition of movements and/or expressions of the mouth 300 of the user) based on the image data captured by the image sensor 120.

In some cases, the FOE 500 of the light emitter 115 can also include other areas of the face of the user such as, for example, the chin of the user (or an area thereof), an area below the nose and above the mouth 300 of the user, a portion(s) of the cheeks of the user's face, an inside of the mouth 300, etc. In some examples, the light emitter 115 can automatically emit light when the structure 105 is in the extended state. In other examples, the light emitter 115 can be triggered to emit light when the image sensor 120 is initialized or triggered. In some cases, the light emitter 115 can be triggered to emit light by a camera application or any other application of the mobile device 100 such as, for example, an XR application, a video collaboration application, a facial avatar application, a gaming application, a system application, a light emitter application, and/or any other application or process on the mobile device 100. In other cases, the light emitter 115 can be triggered to emit light manually by the user. For example, the user can press a physical button on the mobile device 100 (e.g., on the housing 200) or select a virtual button displayed by a display of the mobile device 100 to trigger the light emitter 115 to emit light. As another example, the user can use voice commands and/or gestures to trigger the light emitter 115 to emit light.

The light emitter 115 can be positioned facing the mouth 300 of the user to allow the light emitter 115 to illuminate the mouth 300 of the user (and, in some cases, one or more additional areas of the user's face) when the light emitter 115 emits light. In some examples, the light emitter 115 can be positioned in front of the mouth 300 of the user and facing the mouth 300 of the user. In other examples, the light emitter 115 can face the mouth 300 of the user from a position above the mouth 300 of the user.

In some cases, the light emitter 115 of the structure 105 can reside above the image sensor 120 of the structure 105. In other cases, the light emitter 115 of the structure 105 can reside below the image sensor 120 of the structure 105. In yet other cases, the light emitter 115 can reside next to (or significantly next to) the image sensor 120 (e.g., adjacent to the image sensor 120 or significantly adjacent to the image sensor 120) along the lateral axis of the housing 200. In other words, the light emitter 115 and the image sensor 120 of the structure 105 can be positioned side-by-side along the lateral axis of the housing 200 (e.g., on the same (or significantly the same) coordinates of the lateral axis shown in FIG. 5 but different coordinates of the longitudinal axis shown in FIG. 5).

In some cases, the light emitter 115 can be pre-calibrated and/or re-calibrated. For example, the amount of light emitted by the light emitter 115 and/or the intensity of the light/illumination of the light emitter 115 can be pre-calibrated as desired. To illustrate, light emitter 115 can have a factory calibration (e.g., pre-calibration) and/or an in-field adjustment (e.g., an adjustment at the time of use of the mobile device 100).

FIG. 6 is a diagram illustrating an example design of the mobile device 100 with the structure 105. In this example, the mobile device 100 is an HMD. However, in other examples, the mobile device 100 can have other designs and/or form factors. For example, in some cases, the mobile device 100 can be designed as smart glasses with the structure 105 configured to extend from a portion of the glasses, such as a nose bridge, to place the structure 105 is in the extended state. In such examples, the structure 105 can retract back into a portion of the glasses, such as the nose bridge or an opening of the housing in or near the nose bridge, to place the structure 105 in the retracted state.

In the example shown in FIG. 6, the housing 200 of the mobile device 100 can include a opening 225 to receive the structure 105 when the structure 105 is in the retracted state. In some cases, the opening 225 can be located on a bottom portion of the housing 200. For example, the opening 225 can be located on the same side of the housing 200 (and/or on a same plane) as a nose bridge (e.g., nose bridge 210 shown in FIGS. 2A and 2B). In some cases, a length of the opening 225 can be at least as long as the structure 105 (e.g., in the longitudinal direction) so as to allow the structure 105 to be contained within the opening 225 in a horizontal disposition/placement (e.g., relative to the bottom of the housing 200). In some cases, the structure 105 can rotate or swing from an extended state into the opening 225 to place the structure 105 in the retracted state. In such cases, when the structure 105 is in the retracted state, the structure 105 can sit horizontally (e.g., along a same plane as the nose bridge 210 and/or the bottom of the housing 200) within the opening 225.

The adjustment mechanism 110 can be configured to hold or lock the structure 105 in the retracted state and/or the extended state. In some examples, the adjustment mechanism 110 can include one or more locks to hold the structure 105 in the retracted state when the structure 105 is retracted, and/or hold the structure 105 in the extended state when the structure 105 is deployed/extended. For example, the adjustment mechanism 110 can include a lock(s) to hold the structure 105 in the retracted state when the structure 105 is retracted, and another lock(s) to hold the structure 105 in the extended state when the structure 105 is deployed/extended. As another example, the adjustment mechanism 110 can include a lock(s) configured to hold the structure 105 in the retracted state when the structure 105 is retracted and hold the structure 105 in the extended state when the structure 105 is deployed/extended.

The adjustment mechanism 110 can include one or more locks of any type such as, for example and without limitation, a magnetic lock(s), an electric lock(s), a mechanical lock(s), and/or any other type of lock(s) or combination thereof. For example, in some cases, the adjustment mechanism 110 can include one or more magnets such as, for example, a permanent magnet, a ferromagnet, an electromagnet, or any combination thereof. In some examples, the one or more magnets may be used to attract or repel other magnets or ferromagnetic materials to provide a magnetic pushing or pulling force used by the adjustment mechanism 110 to hold the structure 105 in the retracted state when retracted, and/or the extended state when deployed/extended. In some cases, the adjustment mechanism 110 may include one or more springs. The one or more springs may include one or more compression springs and/or one or more tension springs.

In some cases, the adjustment mechanism 110 may push or pull the structure 105 from the extended state to the retracted state and/or vice versa. In some cases, the adjustment mechanism 110 can move the structure 105 from the retracted state to the extended state and/or from the extended state to the retracted state. For example, the adjustment mechanism 110 may push or pull the structure 105 from the retracted state to the extended state and/or from the extended state to the retracted state.

In some cases, the adjustment mechanism 110 can include one or more motors (not shown). In such cases, the adjustment mechanism 110 can use the one or more motors to move one or more components of the adjustment mechanism 110, such as one or more gears or pulleys. The motorized components may, in some cases, directly move the structure 105 between the retracted state and the extended state. The motorized components may, in some cases, indirectly allow the structure 105 to move between the retracted state and the extended state. For example, the motorized components may indirectly allow the structure 105 to move between the retracted state and the extended state by moving an occlusion from a first position to a second position. In the first position, the occlusion may prevent a pushing or pulling force of a spring or magnet from moving the structure 105 by occluding the path of the structure 105. In the second position, the occlusion may no longer occlude the path of the structure 105, and therefore allow the pushing or pulling force of the spring or magnet to move the structure 105.

In some cases, the adjustment mechanism 110 and/or the structure 105 can include one or more motors that may be used to move portions of the structure 105 to help point the image sensor 120 in different directions. For example, the adjustment mechanism 110 can use the one or more motors to initiate and/or effect a folding or unfolding of the structure 105. As another example, the adjustment mechanism 110 can use the one or more motors to initiate and/or effect a repositioning of the structure 105.

The structure 105 can include the image sensor 120 and the light emitter 115. In some cases, the structure 105 can include one or more other components such as, for example and without limitation, a microphone, an IR transmitter, a sensor (e.g., an IMU, an IR sensor, an RGB sensor, a motion sensor, etc.), a wireless communications interface, etc. The structure 105 can include a printed circuit board (PCB), a flexible printed circuit (FPC), a bus, and/or a flexible flat cable(s) to connect the image sensor 120 and the light emitter 115 (and any other components of the structure 105) with each other and/or with other components of the mobile device 100. In the example shown in FIG. 6, the structure 105 includes an FPC 610 for connecting the image sensor 120 and the light emitter 115 (and any other components of the structure 105) with each other and/or with other components of the mobile device 100.

In some examples, the image sensor 120 and the light emitter 115 (and any other components of the structure 105) can be mounted on and/or integrated in a PCB or an FPC. For example, the image sensor 120 and the light emitter 115 (and any other components of the structure 105) can be mounted on and/or integrated in FPC 610. In some cases, a portion of the structure 105 can be coupled/attached to a portion of the mobile device 100 within the opening 225 by one or more attachment/coupling components such as, for example and without limitation, a pin, a screw, a flange, a gear coupling component, a magnetic coupling component, a locking component, a spring coupling component, an adapter, a bolt, an electric coupling component, male and female connectors, magnets, a mechanical connector and/or assembly, an interference fit (e.g., a press fit or friction fit), a bond, a swivel, and/or any other attachment/coupling components and/or techniques.

FIG. 7A is a view of the structure 105 in an extended state 700. In this example, the structure 105 can extend from the opening 225 and can be held or locked in the extended state 700 by locks 705 and 710. In some cases, the structure 105 can be manually extended to the extended state 700. For example, the user wearing the mobile device 100 can press a button on the housing 200 to release the structure 105. When released, the structure 105 can extend to the extended state 700. In other examples, the user wearing the mobile device 100 can pull the structure 105 to the extended state 700 or push the structure 105 to release it to the extended state 700. In yet other examples, the structure 105 can be automatically extended to the extended state 700 by a motor and/or spring on the mobile device 100.

In some cases, the lock 705 can reside on the housing 200 of the mobile device 100 and the lock 710 can reside on the structure 105. For example, the lock 705 can reside on a wall or side (or portion thereof) of the opening 225 of the housing 200, and the lock 710 can reside on a portion of the structure 105, such as an end of the structure 105. The locks 705 and 710 can be part of the adjustment mechanism 110 previously described.

In some examples, each of the locks 705 and 710 can include a magnet such as, for example, a permanent magnet, a ferromagnet, an electromagnet, or any combination thereof. The magnets may be used to attract or repel each other to provide a magnetic pushing or pulling force used by the magnets to hold the structure 105 in the extended state 700. In some cases, the magnets can be used to attract or repel one or more ferromagnetic materials to provide a magnetic pushing or pulling force used to hold the structure 105 in the extended state 700.

The structure 105 can extend from the housing 200 (e.g., from the opening 225) along a lateral plane 720 of the housing 200. For example, in some cases, the structure 105 can move or swing from a position within the opening 225 that is parallel to a longitudinal plane 725 of the housing 200 to a position that is perpendicular to the longitudinal plane 725 of the housing 200. In some cases, when the structure 105 is in the extended state 700, the locks 705 and 710 can hold the structure 105 in the position that is perpendicular to the longitudinal plane 725 of the housing 200. In other cases, the structure 105 can extend to a position having another orientation (e.g., an acute or obtuse angle relative to the longitudinal plane 725 of the housing 200), and can be held in that position by the locks 705 and 710.

FIG. 7B is a view of the structure 105 in a retracted state 750. In this example, the structure 105 is contained within the opening 225 shown in FIG. 7A. The structure 105 can be fully or partially contained within the opening 225 shown in FIG. 7A. Moreover, the structure 105 can be extended from the retracted state 750 to the extended state 700 shown in FIG. 7A, and retracted/recessed from the extended state 700 shown in FIG. 7A to the retracted state 750.

In some cases, the structure 105 can be manually retracted from the extended state 700 shown in FIG. 7A to the retracted state 750. For example, the user wearing the mobile device 100 can press a button on the housing 200 to retract the structure 105 to the retracted state 750. In other examples, the user wearing the mobile device 100 can pull the structure 105 to the retracted state 750. In yet other examples, the structure 105 can be automatically retracted to the retracted state 750 by a motor and/or spring on the mobile device 100.

The structure 105 can be held or locked in the retracted state 750 by locks 755 and 760. In some cases, the lock 755 can reside on the housing 200 of the mobile device 100 and the lock 760 can reside on the structure 105. For example, the lock 755 can reside on a wall or side (or portion thereof) of the opening 225 of the housing 200 shown in FIG. 7A, and the lock 760 can reside on a portion of the structure 105, such as an end of the structure 105. The locks 755 and 760 can be part of the adjustment mechanism 110 previously described.

In some examples, each of the locks 755 and 760 can include a magnet such as, for example, a permanent magnet, a ferromagnet, an electromagnet, or any combination thereof. The magnets may be used to attract or repel each other to provide a magnetic pushing or pulling force used by the magnets to hold the structure 105 in the retracted state 750. In some cases, the magnets can be used to attract or repel one or more ferromagnetic materials to provide a magnetic pushing or pulling force used to hold the structure 105 in the retracted state 750.

As shown in FIG. 7B, the structure 105 can be contained within the housing 200 (e.g., within the opening 225 shown in FIG. 7A) and positioned such that a longitudinal axis of the structure 105 is parallel or significantly parallel to the longitudinal plane 725 of the housing 200. The structure 105 can be fully or partially contained within the opening 225 of the housing 200 shown in FIG. 7A. In other cases, the structure 105 can be fully or partially contained within the housing 200 and positioned (e.g., within the housing 200) such that a longitudinal axis of the structure 105 is perpendicular to or significantly perpendicular to the longitudinal plane 725 of the housing 200. In yet other cases, the structure 105 can be fully or partially contained within the housing 200 and retained in a position (e.g., within the housing 200) having another orientation (e.g., an acute or obtuse angle relative to the lateral plane 720 or the longitudinal plane 725).

In some cases, the structure 105 can move or swing from the extended state 700 shown in FIG. 7A to a position within the opening 225 shown in FIG. 7A that is parallel to the longitudinal plane 725 of the housing 200. In some cases, when the structure 105 is in the retracted state 750, the locks 755 and 760 can hold the structure 105 in the position that is parallel to (or significantly parallel to) the longitudinal plane 725 of the housing 200. In other cases, the structure 105 can be held by the locks 755 and 760 in a position having another orientation (e.g., an acute or obtuse angle relative to the lateral plane 720 or the longitudinal plane 725 of the housing 200).

Figure 8:
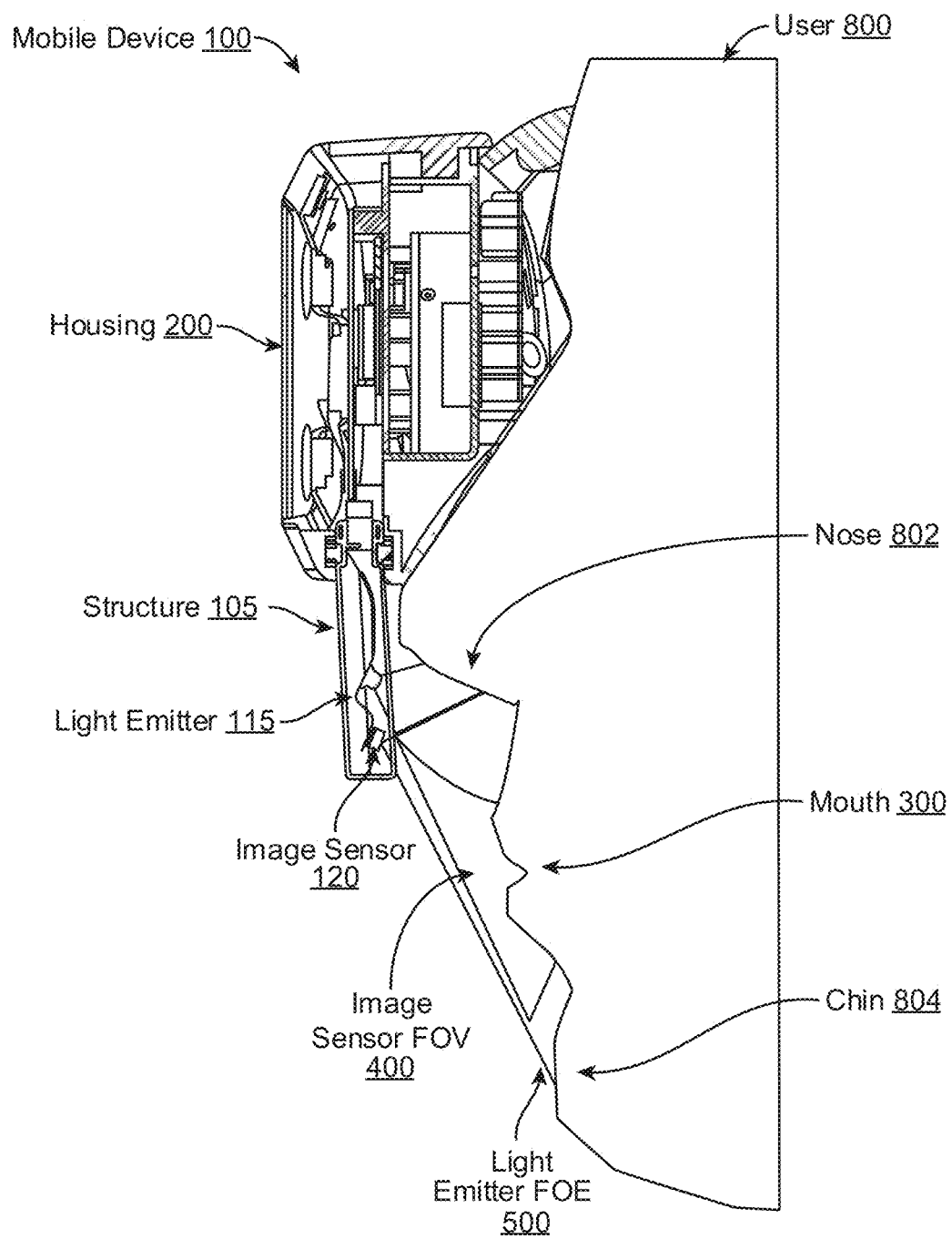
FIG. 8 is a cross-sectional view of an example structure of a mobile device that has an image sensor and is in an extended state, in accordance with some examples of the present disclosure.

FIG. 8 is a cross-sectional view of the structure 105 when the structure 105 is in an extended state. As shown, the structure 105 can extend from a bottom of the housing 200 of the mobile device 100 to allow the image sensor 120 of the structure 105 to capture images and/or video frames of the mouth 300 of the user 800 wearing the mobile device 100.

When the structure 105 is in the extended state shown in FIG. 8, the image sensor 120 can have a view of the mouth 300 of the user 800 wearing the mobile device 100. The image sensor 120 of the structure 105 can be positioned facing the mouth 300 of the user 800 to have the view of the mouth 300 of the user 800. In some examples, the image sensor 120 of the structure 105 can be positioned in front of the mouth 300 of the user 800 and facing the mouth 300 of the user 800. In other examples, the image sensor 120 can face the mouth 300 of the user 800 from a position above the mouth 300 of the user 800 (e.g., above the mouth 300 and below the nose 802, above the nose 802, or at the level of the nose 802).

The extended state of the structure 105 can place the mouth 300 of the user 800 within the FOV 400 of the image sensor 120 of the structure 105. Thus, when the structure 105 is in the extended state, the FOV 400 of the image sensor 120 can include the mouth 300 of the user 800. In some cases, the FOV 400 of the image sensor 120 can also include other areas of the face of the user 800 such as, for example, the nose 802 (or an area thereof), the chin 804 (or an area thereof), an area below the nose 802 and above the mouth 300, a portion(s) of the cheeks of the user's face, an inside of the mouth 300, etc.

Moreover, when the structure 105 is in the extended state, the light emitter 115 of the structure 105 can illuminate areas of the face of the user 800 wearing the mobile device 100. For example, when the structure 105 is in the extended state, the light emitter 115 can illuminate the mouth 300 of the user 800. In some cases, when the structure 105 is in the extended state, the light emitter 115 can illuminate other portions of the face of the user 800 such as, for example, the nose 802 (or an area thereof), the chin 804 (or an area thereof), an area below the nose 802 and above the mouth 300, a portion(s) of the cheeks of the user's face, an inside of the mouth 300, etc. The light emitter 115 can illuminate the mouth 300 (and, in some cases, other portions of the face of the user 800 as previously described) to help the image sensor 120 of the structure 105 capture images and/or video frames of the mouth 300 of the user (and, in some cases, other areas of the face of the user as previously described).

As shown in FIG. 8, the extended state of the structure 105 can place the mouth 300 of the user within the FOE 500 of the light emitter 115 of the structure 105. In other words, when the structure 105 is in the extended state, the FOE 500 of the light emitter 115 can include the mouth 300 of the user. The FOE 500 represents the light coverage of the light emitter 115 when the structure 105 is in the extended state. For example, the FOE 500 represents the area illuminated by the light emitter 115 when the structure 105 is in the extended state. Thus, the light emitter 115 can illuminate the areas of the user's face being imaged or recorded by the image sensor 120. This can improve the quality of the image data captured by the image sensor 120, as well as the tracking of the mouth 300 performed by the mobile device 100 (and/or detection and/or recognition of movements and/or expressions of the mouth 300 of the user 800) based on the image data captured by the image sensor 120.

The light emitter 115 of the structure 105 can be positioned facing the mouth 300 of the user 800 to allow the light emitter 115 to illuminate the mouth 300 of the user 800 (and, in some cases, one or more additional areas of the user's face) when the light emitter 115 emits light. In some examples, the light emitter 115 can be positioned in front of the mouth 300 of the user 800 and facing the mouth 300 of the user 800. In other examples, the light emitter 115 can face the mouth 300 of the user 800 from a position above the mouth 300 of the user 800 (e.g., above the mouth 300 and below the nose 802, above the nose 802, or at level with the nose 802).

In some cases, the light emitter 115 of the structure 105 can reside above the image sensor 120 of the structure 105. In other cases, the light emitter 115 of the structure 105 can reside below the image sensor 120 of the structure 105. In yet other cases, the light emitter 115 can reside next to (or significantly next to) the image sensor 120 (e.g., adjacent to the image sensor 120 or significantly adjacent to the image sensor 120) along a lateral axis of the housing 200. In other words, the light emitter 115 and the image sensor 120 of the structure 105 can be positioned side-by-side along the lateral axis of the housing 200 (e.g., on the same (or significantly the same) coordinates of the lateral axis of the housing 200 but different coordinates of the longitudinal axis of the housing 200).

When the structure 105 is in the extended state, the light emitter 115 can illuminate the mouth 300 of the user 800 (and, in some cases, other portions of the face of the user 800 as previously described) and the image sensor 120 can capture images and/or video frames of the mouth 300 of the user 800 (and, in some cases, other areas of the face of the user 800 as previously described). In some cases, the mobile device 100 can use the captured images and/or video frames from the image sensor 120 to detect and/or recognize movements of the mouth 300, mouth gestures and/or expressions, etc. In some examples, the mobile device 100 can use the captured images and/or video frames from the image sensor 120 to perform mouth tracking.

In some examples, when the structure 105 is in the extended state, the image sensor 120 can capture all the image data needed to track and/or reconstruct the mouth 300 of the user 800 without the need of a stereo imaging setup with multiple cameras. For example, when the structure 105 is in the extended state, the image sensor 120 can capture (e.g., view and image/record) the top lip of the mouth 300, the bottom lip of the mouth 300, the sides of the mouth 300, any movement of the mouth 300, the chin 804 (or a portion thereof), an area below the nose 802 and above the mouth 300, a portion of the nose 802, or any combination thereof. In some cases, if the mouth 300 of the user 800 is open, when the structure 105 is in the extended state, the image sensor 120 can capture (e.g., view and image/record) the inside of the mouth 300.

In some examples, the image sensor 120 can be pre-calibrated based on the relative poses of the housing 200 and the image sensor 120 when the structure 105 is in the extended state. For example, the position of the image sensor 120 (e.g., relative to the pose of the housing 200) when the structure 105 is in the extended state can be used to calibrate the image sensor 120 to allow the mobile device 100 to accurately image/record the mouth 300, track the mouth 300 of the user based on images and/or video frames captured by the image sensor 120 when the structure 105 is in the extended state etc. In some cases, the image sensor 120 can have a fixed position relative to the housing 200 when the structure 105 is in the extended state. The fixed position of the image sensor 120 can be used to calibrate the image sensor 120 for imaging/recording of the mouth 300, tracking of the mouth 300, etc.

In some cases, the image sensor 120 can additionally or alternatively be calibrated based on the position of the image sensor 120 when the structure 105 is in the extended state and an estimated location (or location ranges) of the mouth 300 of the user 800 relative to the position of the image sensor 120. In some examples, the image sensor 120 can be calibrated based on the position of the image sensor 120 when the structure 105 is in the extended state and the average location (or location ranges) of a reference point in a human face. The reference point in a human face can include, for example, a human mouth (or a region or point thereof), a human chin (or a region or point thereof, etc.). In some cases, the average location (or location ranges) of the reference point in a human face can be determined based on the average size and/or shape of a human head, the average size and/or shape of the human mouth, the average distance between two or more points on a human face (e.g., mouth and chin, mouth and nose, nose and chin, the cheeks, the eyes and mouth, a point of the head and the mouth, etc.), and/or the average size and/or shape of any other facial regions.

In some cases, the depth from the mouth 300 to the image sensor 120 when the structure 105 is in the extended state can be calibrated. In some examples, the depth from the mouth 300 to the image sensor 120 when the structure 105 is in the extended state can be estimated and used to pre-calibrate the image sensor 120.

The calibration of the image sensor 120 can help the mobile device 100 more accurately image/record the mouth 300 of the user 800, track the mouth 300 of the user 800 based on images and/or video frames captured by the image sensor 120 when the structure 105 is in the extended state, etc. As previously explained, in some examples, the image sensor 120 can have a fixed position when the structure 105 is in the extended state. The fixed position can prevent (or limit) the need to recalibrate the image sensor 120 for a particular user and/or the need to recalibrate the image sensor 120 multiple times or more frequently (e.g., before each use, after a number of uses, after a period of time, from user to user, etc.).

In some examples, the design of the mobile device 100 with the structure 105 can provide privacy benefits. For example, the user 800 of the mobile device 100 can determine whether the image sensor 120 of the structure 105 is active or in use based on the state of the structure 105. To illustrate, if the structure 105 is in the retracted state, the user 800 can determine that the image sensor 120 is not active or in use. If the structure 105 is in the extended state, the user 800 can determine that the image sensor 120 is active or in use (or is potentially active or in use).

FIG. 9A is a flowchart illustrating an example process 900 for processing image data captured by a camera sensor of a camera structure (e.g., structure 105) while the camera structure is in an extended state. At block 902, the process 900 can include activating an adjustment mechanism (e.g., adjustment mechanism 110) that moves a camera structure (e.g., structure 105) of a mobile device (e.g., mobile device 100) from a retracted state where the structure is retracted into an opening (e.g., opening 225) of a housing (e.g., housing 200) of the mobile device, to an extended state where at least a portion of the structure extends from a side (e.g., bottom side or portion) of the housing of the mobile device. In some examples, activating the adjustment mechanism can include pushing or pulling a portion of the structure, engaging (e.g., pressing, pushing, pulling, selecting, etc.) a release element (e.g., a button, etc.) on the housing of the mobile device, and/or initiating a motor on the mobile device.

In some cases, the structure is configured to move from the retracted state where at least a portion of the structure is retracted into the opening of the housing, to the extended state where at least a portion of the structure extends from a side (e.g., a bottom side or portion) of the housing. For example, when the structure is in the retracted state, at least a portion of the structure that includes a camera sensor, a lens associated with the camera sensor, and/or any other components in the structure, can be retracted within the housing (or at least partially within the housing) of the mobile device so as to not protrude from the housing and/or so as to provide protective cover for the sensor, the lens, and/or any other components in the structure when not in use. In some cases, the structure is configured to move from the extended state to the retracted state.

In some examples, the housing of the mobile device can include one or more surfaces configured to engage a head of a user when the user wants to wear the mobile device on the user's head. For example, the one or more surfaces of the housing can be sized and shaped according to a user's head (or a portion of a user's head) to allow the one or more surfaces to engage the user's head when the user wants to wear the mobile device.

To illustrate, the one or more surfaces of the housing can be sized and shaped to match or significantly match (e.g., within a range) at least a portion of a user's head, such as a face region. The one or more surfaces of the housing can be sized and shaped to fit a portion of a user's head, such as a facial region, when the mobile device is worn by the user. In some cases, the one or more surfaces of the housing can be sized and shaped to match or significantly match at least a portion of a head of a particular user, an average user, a range of users, or any user. In some cases, the one or more surfaces of the housing can be sized and shaped to accommodate a range of size and shape dimensions of a human head. In some examples, the one or more surfaces of the housing can be configured to at least partially deform to match or significantly match a user's head or a user's facial contour when the user wears the mobile device. For example, the one or more surfaces of the housing can include a material that can deform to match a user's facial contour when the mobile device is worn by the user.

At block 904, the process 900 can include capturing one or more images using a camera sensor (e.g., image sensor 120) in the structure while the structure is in the extended state. As previously explained, the camera sensor can have a fixed position relative to the housing when the structure is in the extended state. The fixed position of the camera sensor when the structure is in the extended state can provide the camera sensor a view of a mouth of a user wearing the mobile device. For example, when the structure is in the extended state, the mouth of the user wearing the mobile device can be within a FOV of the camera sensor.

At block 906, the process 900 can include detecting a mouth depicted in the one or more images. For example, the mobile device can implement a mouth detection algorithm to detect the mouth depicted in the one or more images. In some aspects, the process 900 can include tracking the mouth based on the detecting of the mouth depicted in the one or more images.

The camera sensor can be located at a fixed position within the structure. Moreover, a side of the camera sensor configured to receive light can face a same direction as a display of the mobile device. For example, a side of the camera sensor configured to receive light can face towards a face of a user when the user wears the mobile device. In some cases, the structure can include a light emitter. In some examples, the light emitter can be located at a fixed position within the structure. In some examples, a display of the mobile device can emit light in a particular direction, and at least a portion of a field-of-emission of the light emitter can extend in the particular direction of the light emitted by the display.

In some cases, the structure can include a microphone, an infrared (IR) sensor, a wireless interface, a color sensor (e.g., an RGB sensor), and/or an IR transmitter. In some examples, the structure can include one or more processing elements such as, for example and without limitation, an ASIC, a processor, a memory, etc.

In some examples, when the structure is in the extended state, the structure can extend from a bottom portion of the housing at an angle relative to a longitudinal axis of the housing. In some cases, when the structure is in the extended state, the structure can extend from the bottom portion of the housing and perpendicular to a longitudinal axis of the housing.

In some cases, the structure can be configured to move or swing from the retracted state to the extended state and from the extended state to the retracted state.

In some examples, the housing can include a nose bridge. In some cases, when the structure is in the extended state, a camera sensor and/or lens in the structure can face a same direction as a direction of light emitted by a display of the mobile device, and can extend below the nose bridge and relative to a longitudinal axis of the housing.

In some aspects, the process 900 can include tracking the mouth depicted in the one or more images captured by the camera sensor.

In some cases, the adjustment mechanism can be configured to hold the structure within the opening of the housing when the structure is in the retracted state, and hold the structure in the extended position relative to the bottom portion of the housing when the structure is in the extended state. In some examples, the adjustment mechanism can include one or more magnets.

In some cases, the mobile device can include a motor. In some examples, when the motor is activated, the motor can extend the structure from the retracted state to the extended state. In some examples, when the motor is activated, the motor can retract the structure from the extended state to the retracted state.

In some aspects, the process 900 can include, in response to a trigger, sending, to the motor, a signal configured to activate the motor. In some examples, the trigger can include a voice command, a user gesture, an initialization of an application on the mobile device, a user input, and/or a selection of a release element on the housing of the mobile device.

In aspects, the process 900 can include, in response to a determination that the structure is in the extended state, triggering the camera to capture the one or more images.

In aspects, the process 900 can include determining that an image captured by the camera sensor while the structure is in the extended state does not depict a mouth; and based on the determining that the image does not depict the mouth and further based on a predetermined position of the camera sensor relative to the housing when the structure is in the extended state, generate a notification indicating that the mobile device and/or the camera sensor is misoriented.

In aspects, the process 900 can include determining that an image captured by the camera sensor while the structure is in the extended state does not depict a mouth; and based on the determining that the image does not depict the mouth and further based on a predetermined position of the camera sensor relative to the housing when the structure is in the extended state, turning off or reducing a power mode of the camera sensor.

In some cases, the adjustment mechanism can also be configured to move the structure from the extended state to the retracted state. In some aspects, the process 900 can include activating the adjustment mechanism to move the structure containing the camera sensor from a extended state to the retracted state.

FIG. 9B is a flowchart illustrating another example process 920 for processing image data captured by a camera sensor of a camera structure (e.g., structure 105) while the structure is in an extended state. At block 922, the process 920 can include moving a structure (e.g., structure 105) of a mobile device (e.g., mobile device 100) from a retracted state where at least a portion of the structure is retracted into an opening (e.g., opening 225) in a first side (e.g., a bottom side) of a housing (e.g., housing 200) of the mobile device, to an extended state where at least a portion of the structure that includes a lens configured to receive incident light extends from the first side of the housing of the mobile device. In some examples, the structure can include a camera sensor(s) (e.g., image sensor 120).

In some examples, when the structure is in the retracted state, at least a portion of the structure that includes a camera sensor, a lens associated with the camera sensor, and/or any other components in the structure, can be retracted within the housing (or at least partially within the housing) of the mobile device so as to not protrude from the housing and/or so as to provide protective cover for the sensor, the lens, and/or any other components in the structure when not in use. In some cases, the opening of the housing is located at the first side portion of the housing. In some cases, the housing can include one or more surfaces configured to engage a head of a user.

For example, the one or more surfaces of the housing can be sized and shaped according to a user's head (or a portion of a user's head) to allow the one or more surfaces to engage the user's head when the user wants to wear the mobile device. To illustrate, the one or more surfaces of the housing can be sized and shaped to match or significantly match (e.g., within a range) at least a portion of a user's head, such as a face region. The one or more surfaces of the housing can be sized and shaped to fit a portion of a user's head, such as a facial region, when the mobile device is worn by the user. In some cases, the one or more surfaces of the housing can be sized and shaped to match or significantly match at least a portion of a head of a particular user, an average user, a range of users, or any user. In some cases, the one or more surfaces of the housing can be sized and shaped to accommodate a range of size and shape dimensions of a human head.

In some examples, the one or more surfaces of the housing can be configured to at least partially deform to match or significantly match a user's head or a user's facial contour when the user wears the mobile device. For example, the one or more surfaces of the housing can include a material that can deform to match a user's facial contour when the mobile device is worn by the user.

At block 924, the process 920 can include receiving incident light by the lens while the structure is in the extended state. In some aspects, the process 920 can include processing image data captured by the camera sensor while the structure is in the extended state.

In some examples, the camera sensor is located at a fixed position within the housing and/or the structure. In some aspects, the structure further comprises a light emitter. In some cases, the light emitter is located at a second fixed position within the structure that is different than the first fixed position of the camera sensor. In some examples, a display of the mobile device can emit light in a first direction, and at least a portion of a field-of-emission of the light emitter extends in the first direction.

In some examples, the structure can include a microphone, an infrared (IR) sensor, a wireless interface, a color sensor, one or more processing elements (e.g., an ASIC, a processor, a memory, etc.), and/or an IR transmitter.

In some examples, when the structure is in the extended state, the structure can extend from the first side (e.g., bottom side or portion) of the housing and at an angle relative to a longitudinal axis of the housing. In some examples, when the structure is in the extended state, the structure can extend from the first side of the housing and perpendicular to a longitudinal axis of the housing.

In some cases, the structure is configured to move or swing from the retracted state to the extended state and from the extended state to the retracted state.

In some examples, the housing can include a nose bridge. In some cases, when the structure is in the extended state, an optical axis of the lens or the camera sensor on the structure faces a same direction as light emitted by one or more displays of the mobile device and extends below the nose bridge and relative to a longitudinal axis of the housing.

In some aspects, the process 920 can include detecting a mouth depicted in image data captured by the camera sensor when the structure is in the extended state. In some aspects, the process 920 can include tracking the mouth depicted in the image data captured by the camera sensor.

In some aspects, the process 920 can include holding, via a locking mechanism, the structure within the opening of the housing when the structure is in the retracted state. In some aspects, the process 920 can include holding the structure in an extended position relative to the first side of the housing when the structure is in the extended state. In some examples, the locking mechanism can include one or more magnets.

In some aspects, the process 920 can include extending, via a motor of the mobile device, the structure from the retracted state to the extended state. In some aspects, the process 920 can include, in response to a trigger, sending, to the motor, a signal configured to activate the motor. In some examples, the trigger can include a voice command, a user gesture, an initialization of an application on the mobile device, a user input, and/or a selection of a release element on the housing of the mobile device.

In some aspects, the process 920 can include retracting, via a motor of the mobile device, the structure from the extended state to the retracted state. In some aspects, the process 920 can include, in response to a determination that the structure is in the extended state, triggering the camera sensor to capture image data.

In some aspects, the process 920 can include determining that one or more images captured by the camera sensor on the structure while the structure is in the extended state do not depict a mouth; and based on determining that the one or more images do not depict the mouth and further based on a predetermined position of the camera sensor relative to the housing when the structure is in the extended state, generating a notification indicating that at least one of the mobile device and the camera sensor is misoriented.

In some aspects, the process 920 can include determining that one or more images captured by the camera sensor on the structure while the structure is in the extended state do not depict a mouth; and based on determining that the one or more images do not depict the mouth and further based on a predetermined position of the camera sensor relative to the housing when the structure is in the extended state, turning off or reducing a power mode of the camera sensor.

In some aspects, the structure is configured to move from the extended state to the retracted state.

In some examples, the process 900 and/or the process 920 may be performed by one or more computing devices or apparatuses. In one illustrative example, the process 900 and/or the process 920 can be performed by the mobile device 100 shown in FIG. 1. In some examples, the process 900 and/or the process 920 can be performed by one or more computing devices with the computing device architecture 1000 shown in FIG. 10. In some cases, such a computing device or apparatus may include a processor, microprocessor, microcomputer, or other component of a device that is configured to carry out the steps of the process 900 and/or the process 920. In some examples, such computing device or apparatus may include one or more sensors configured to capture image data and/or other sensor measurements. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 900 and the process 920 are illustrated as logical flow diagrams, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 and/or the process 920 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 10 is a diagram illustrating an example of a system for implementing certain aspects of the present technology. In particular, FIG. 10 illustrates an example of computing system 1000, which can be for example any computing device making up internal computing system, a remote computing system, a camera, or any component thereof in which the components of the system are in communication with each other using connection 1005. Connection 1005 can be a physical connection using a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache 1012 of high-speed memory connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the present disclosure include:

Aspect 1. An apparatus comprising a head-mounted display for processing image data, the apparatus comprising: a housing with an opening formed in a first side of the housing, wherein one or more surfaces of the housing are configured to engage a head of a user; and a structure comprising a lens configured to receive incident light, wherein the structure is configured to move from a retracted state where at least a portion of the structure is retracted into the opening in the first side of the housing, to an extended state where at least a portion of the structure that includes the lens extends from the first side of the housing.

Aspect 2. The apparatus of Aspect 1, further comprising a camera sensor located at a fixed position within at least one of the housing and the structure.

Aspect 3. The apparatus of Aspect 2, wherein the structure further comprises a light emitter, wherein the light emitter is located at a second fixed position within the structure, wherein the second fixed position is different than the fixed position of the camera sensor, wherein a display of the apparatus emits light in a first direction, and wherein at least a portion of a field-of-emission of the light emitter extends in the first direction.

Aspect 4. The apparatus of any of Aspects 1 to 3, wherein the structure further comprises at least one of a microphone, an infrared (IR) sensor, a wireless interface, a color sensor, and an IR transmitter.

Aspect 5. The apparatus of any of Aspects 1 to 4, wherein, in the extended state, the structure extends from the first side of the housing and at an angle relative to a longitudinal axis of the housing.

Aspect 6. The apparatus of any of Aspects 1 to 4, wherein, in the extended state, the structure extends from the first side of the housing and perpendicular to a longitudinal axis of the housing.

Aspect 7. The apparatus of any of Aspects 1 to 6, wherein the structure is configured to move from the retracted state to the extended state and from the extended state to the retracted state.

Aspect 8. The apparatus of any of Aspects 1 to 7, further comprising one or more processors coupled to one or more memory components, the one or more processors being configured to process image data captured by a camera sensor on the structure while the structure is in the extended state.

Aspect 9. The apparatus of any of Aspects 1 to 8, wherein the housing further comprises a nose bridge, wherein, in the extended state, an optical axis of the lens or a camera sensor on the structure faces a same direction as light emitted by one or more displays of the apparatus, and wherein the structure extends below the nose bridge and relative to a longitudinal axis of the housing.

Aspect 10. The apparatus of any of Aspects 1 to 9, further comprising one or more processors configured to track a mouth depicted in image data captured by a camera sensor on the structure.

Aspect 11. The apparatus of any of Aspects 1 to 10, further comprising a locking mechanism configured to hold the structure within the opening of the housing when the structure is in the retracted state, and hold the structure in an extended position relative to the first side of the housing when the structure is in the extended state.

Aspect 12. The apparatus of Aspect 11, wherein the locking mechanism comprises a magnet.

Aspect 13. The apparatus of any of Aspects 1 to 12, further comprising a motor, wherein the motor, when activated, extends the structure from the retracted state to the extended state.

Aspect 14. The apparatus of Aspect 13, further comprising one or more processors configured to: in response to a trigger, send, to the motor, a signal configured to activate the motor.

Aspect 15. The apparatus of Aspect 14, wherein the trigger comprises at least one of a voice command, a user gesture, an initialization of an application on the apparatus, a user input, and a selection of a release element on the housing of the apparatus.

Aspect 16. The apparatus of any of Aspects 1 to 15, further comprising a motor, wherein the motor, when activated, retracts the structure from the extended state to the retracted state.

Aspect 17. The apparatus of any of Aspects 1 to 16, further comprising one or more processors coupled to a memory, wherein the one or more processors are configured to: trigger a camera sensor on the structure to capture image data.

Aspect 18. The apparatus of Aspect 17, wherein the camera sensor is triggered by a trigger comprising at least one of a voice command, a user gesture, an initialization of an application on the apparatus, a user input, a determination that the structure is in the extended state, and a selection of a release element on the housing of the apparatus.

Aspect 19. The apparatus of any of Aspects 1 to 18, further comprising one or more processors coupled to a memory, wherein the one or more processors are configured to:

determine that one or more images captured by a camera sensor on the structure while the structure is in the extended state do not depict a mouth; and based on determining that the one or more images do not depict the mouth and further based on a predetermined position of the camera sensor relative to the housing when the structure is in the extended state, generate a notification indicating that at least one of the apparatus and the camera sensor is misoriented.

Aspect 20. The apparatus of any of Aspects 1 to 19, further comprising one or more processors coupled to a memory, wherein the one or more processors are configured to: determine that one or more images captured by a camera sensor on the structure while the structure is in the extended state do not depict a mouth; and based on determining that the one or more images do not depict the mouth and further based on a predetermined position of the camera sensor relative to the housing when the structure is in the extended state, turn off or reduce a power mode of the camera sensor.

Aspect 21. The apparatus of any of Aspects 1 to 20, wherein the structure is configured to move from the extended state to the retracted state.

Aspect 22. The apparatus of any of Aspects 1 to 21, further comprising one or more displays.

Aspect 23. The apparatus of any of Aspects 1 to 22, wherein the apparatus comprises a mobile device.

Aspect 24. A method for processing image data, the method comprising: moving a structure of a mobile device from a retracted state where at least a portion of the structure is retracted into an opening in a first side of a housing of the mobile device, to an extended state where at least a portion of the structure that includes a lens configured to receive incident light extends from the first side of the housing of the mobile device, wherein one or more surfaces of the housing are configured to engage a head of a user; and receiving incident light by the lens while the structure is in the extended state.

Aspect 25. The method of Aspect 24, wherein the mobile device further comprises a camera sensor located at a fixed position within at least one of the housing and the structure.

Aspect 26. The method of Aspect 25, wherein the structure further comprises a light emitter, wherein the light emitter is located at a second fixed position within the structure, wherein the second fixed position is different than the fixed position of the camera sensor, wherein a display of the mobile device emits light in a first direction, and wherein at least a portion of a field-of-emission of the light emitter extends in the first direction.

Aspect 27. The method of any of Aspects 23 to 26, wherein the structure further comprises at least one of a microphone, an infrared (IR) sensor, a wireless interface, a color sensor, and an IR transmitter.

Aspect 28. The method of any of Aspects 23 to 27, wherein, in the extended state, the structure extends from the first side of the housing and at an angle relative to a longitudinal axis of the housing.

Aspect 29. The method of any of Aspects 23 to 27, wherein, in the extended state, the structure extends from the first side of the housing and perpendicular to a longitudinal axis of the housing.

Aspect 30. The method of any of Aspects 23 to 29, wherein the structure is configured to move from the retracted state to the extended state and from the extended state to the retracted state.

Aspect 31. The method of any of Aspects 23 to 30, wherein the housing further comprises a nose bridge, wherein, in the extended state, an optical axis of the lens or a camera sensor on the structure faces a same direction as light emitted by one or more displays of the mobile device, and the structure extends below the nose bridge and relative to a longitudinal axis of the housing.

Aspect 32. The method of any of Aspects 23 to 31, further comprising tracking a mouth depicted in image data captured by a camera sensor on the structure.

Aspect 33. The method of any of Aspects 23 to 32, further comprising holding, via a locking mechanism, the structure within the opening of the housing when the structure is in the retracted state, and holding the structure in an extended position relative to the first side of the housing when the structure is in the extended state.

Aspect 34. The method of any of Aspects 23 to 33, further comprising extending, via a motor of the mobile device, the structure from the retracted state to the extended state.

Aspect 35. The method of any of Aspects 23 to 34, further comprising: processing, via one or more processors of the mobile device, image data captured by a camera sensor on the structure while the structure is in the extended state.

Aspect 36. The method of any of Aspects 23 to 35, further comprising: triggering a camera sensor on the structure to capture image data.

Aspect 37. The method of Aspect 36, wherein the camera sensor is triggered by a trigger comprising at least one of a voice command, a user gesture, an initialization of an application on the mobile device, a user input, a determination that the structure is in the extended state, and a selection of a release element on the housing of the mobile device.

Aspect 38. The method of any of Aspects 23 to 37, further comprising: in response to a trigger, sending, to a motor of the mobile device, a signal configured to activate the motor.

Aspect 39. The method of Aspect 38, wherein the trigger comprises at least one of a voice command, a user gesture, an initialization of an application on the mobile device, a user input, and a selection of a release element on the housing of the mobile device.

Aspect 40. The method of any of Aspects 23 to 39, further comprising: determining that one or more images captured by a camera sensor on the structure while the structure is in the extended state do not depict a mouth; and based on determining that the one or more images do not depict the mouth and further based on a predetermined position of the camera sensor relative to the housing when the structure is in the extended state, generating a notification indicating that at least one of the mobile device and the camera sensor is misoriented.

Aspect 41. The method of any of Aspects 23 to 40, further comprising: determining that one or more images captured by a camera sensor on the structure while the structure is in the extended state do not depict a mouth; and based on determining that the one or more images do not depict the mouth and further based on a predetermined position of the camera sensor relative to the housing when the structure is in the extended state, turning off or reducing a power mode of the camera sensor.

What is claimed is:

1. A method for processing image data, the method comprising:
    moving a structure of a mobile device from a retracted state where at least a portion of the structure is retracted into an opening in a first side of a housing of the mobile device, to an extended state where at least a portion of the structure that includes a lens configured to receive incident light extends from the first side of the housing of the mobile device, wherein one or more surfaces of the housing are configured to engage a head of a user;
    receiving incident light by the lens while the structure is in the extended state; and
    moving the structure of the mobile device from the extended state to a retracted state in response to a determination that a field-of-view of the lens does not include at least a portion of a mouth of the user.

2. The method of claim 1, wherein the mobile device further comprises a camera sensor located at a fixed position within at least one of the housing and the structure.

3. The method of claim 2, wherein the structure further comprises a light emitter, wherein the light emitter is located at a second fixed position within the structure, wherein the second fixed position is different than the fixed position of the camera sensor, wherein a display of the mobile device emits light in a first direction, and wherein at least a portion of a field-of-emission of the light emitter extends in the first direction.

4. The method of claim 1, wherein the structure further comprises at least one of a microphone, an infrared (IR) sensor, a wireless interface, a color sensor, and an IR transmitter.

5. The method of claim 1, wherein, in the extended state, the structure extends from the first side of the housing and at an angle relative to a longitudinal axis of the housing.

6. The method of claim 1, wherein, in the extended state, the structure extends from the first side of the housing and perpendicular to a longitudinal axis of the housing.

7. The method of claim 1, wherein the housing further comprises a nose bridge, wherein, in the extended state, an optical axis of the lens or a camera sensor on the structure faces a same direction as light emitted by one or more displays of the mobile device, and the structure extends below the nose bridge and relative to a longitudinal axis of the housing.

8. The method of claim 1, further comprising tracking at least a portion of the mouth of the user depicted in image data captured by a camera sensor on the structure.

9. The method of claim 1, further comprising holding, via a locking mechanism, the structure within the opening of the housing when the structure is in the retracted state, and holding the structure in an extended position relative to the first side of the housing when the structure is in the extended state.

10. The method of claim 1, further comprising extending, via a motor of the mobile device, the structure from the retracted state to the extended state.

11. The method of claim 1, further comprising:
processing, via one or more processors of the mobile device, image data captured by a camera sensor on the structure while the structure is in the extended state.

12. The method of claim 1, further comprising:
triggering a camera sensor on the structure to capture image data.

13. The method of claim 12, wherein the camera sensor is triggered by at least one of a voice command, a user gesture, an initialization of an application on the mobile device, a user input, a determination that the structure is in the extended state, or a selection of a release element on the housing of the mobile device.

14. The method of claim 1, further comprising:
determining that one or more images captured by a camera sensor on the structure while the structure is in the extended state do not depict at least a portion of the mouth of the user; and
based on determining that the one or more images do not depict the at least a portion of the mouth of the user, generating a notification indicating that at least one of the mobile device and the camera sensor is misoriented.

15. The method of claim 1, further comprising:
determining that one or more images captured by a camera sensor on the structure while the structure is in the extended state do not depict at least a portion of the mouth of the user; and
based on determining that the one or more images do not depict the at least a portion of the mouth of the user, turning off or reducing a power mode of the camera sensor.

16. An apparatus for processing image data, the apparatus comprising:
at least one memory; and
at least one processor coupled to the at least one memory and configured to:
cause a structure of the apparatus to move from a retracted state where at least a portion of the structure is retracted into an opening in a first side of a housing of the apparatus, to an extended state where at least a portion of the structure that includes a lens configured to receive incident light extends from the first side of the housing of the apparatus, wherein one or more surfaces of the housing are configured to engage a head of a user;
receive incident light by the lens while the structure is in the extended state; and
cause the structure of the mobile device to move from the extended state to a retracted state in response to a determination that a field-of-view of the lens does not include at least a portion of a mouth of the user.

17. The apparatus of claim 16, further comprising a camera sensor located at a fixed position within at least one of the housing and the structure.

18. The apparatus of claim 17, wherein the structure comprises a light emitter, wherein the light emitter is located at a second fixed position within the structure, wherein the second fixed position is different than the fixed position of the camera sensor, and further comprising a display configured to emit light in a first direction, at least a portion of a field-of-emission of the light emitter extending in the first direction.

19. The apparatus of claim 16, wherein the structure comprises at least one of a microphone, an infrared (IR) sensor, a wireless interface, a color sensor, and an IR transmitter.

20. The apparatus of claim 16, wherein, in the extended state, the structure extends from the first side of the housing and at an angle relative to a longitudinal axis of the housing.

21. The apparatus of claim 16, wherein, in the extended state, the structure extends from the first side of the housing and perpendicular to a longitudinal axis of the housing.

22. The apparatus of claim 16, wherein the housing comprises a nose bridge, wherein, in the extended state, an optical axis of the lens or a camera sensor on the structure faces a same direction as light emitted by one or more displays of the apparatus, and the structure extends below the nose bridge and relative to a longitudinal axis of the housing.

23. The apparatus of claim 16, wherein the at least one processor is configured to track at least a portion of the mouth of the user depicted in image data captured by a camera sensor on the structure.

24. The apparatus of claim 16, further comprising a locking mechanism configured to hold the structure within the opening of the housing when the structure is in the retracted state, wherein the structure is configured to be held in an extended position relative to the first side of the housing when the structure is in the extended state.

25. The apparatus of claim 16, further comprising a motor configured to extend the structure from the retracted state to the extended state.

26. The apparatus of claim 16, wherein the at least one processor is configured to:
process image data captured by a camera sensor on the structure while the structure is in the extended state.

27. The apparatus of claim 16, wherein the at least one processor is configured to:
trigger a camera sensor on the structure to capture image data.

28. The apparatus of claim 26, wherein the camera sensor is triggered by at least one of a voice command, a user gesture, an initialization of an application on the apparatus, a user input, a determination that the structure is in the extended state, or a selection of a release element on the housing of the apparatus.

29. The apparatus of claim 16, wherein the at least one processor is configured to:
determine that one or more images captured by a camera sensor on the structure while the structure is in the extended state do not depict at least a portion of the mouth of the user; and
based on a determination that the one or more images do not depict the at least a portion of the mouth of the user, generate a notification indicating that at least one of the apparatus and the camera sensor is misoriented.

30. The apparatus of claim 16, wherein the at least one processor is configured to:
determine that one or more images captured by a camera sensor on the structure while the structure is in the extended state do not depict at least a portion of the mouth of the user; and
based on a determination that the one or more images do not depict the at least a portion of the mouth of the user, turn off or reduce a power mode of the camera sensor.

31. The apparatus of claim 26, wherein the determination that the field-of-view of the lens does not include at least a portion of the mouth of the user is based on the image data.

32. The apparatus of claim 16, wherein the structure of the mobile device is configured to move from the extended state to the retracted state in response to a user input.

33. The apparatus of claim 32, wherein the at least one processor is further configured to automatically cause the structure of the mobile device to move from the extended state to the retracted state in response to the user input.

\* \* \* \* \*